(12) United States Patent
Roimela et al.

(10) Patent No.: US 12,293,454 B2
(45) Date of Patent: May 6, 2025

(54) MULTIRESOLUTION TRUNCATED NEURAL RADIANCE FIELDS

(71) Applicant: Varjo Technologies Oy, Helsinki (FI)

(72) Inventors: Kimmo Roimela, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 292 days.

(21) Appl. No.: 18/111,340

(22) Filed: Feb. 17, 2023

(65) Prior Publication Data
US 2024/0282051 A1    Aug. 22, 2024

(51) Int. Cl.
G06T 17/00 (2006.01)
G06T 7/11 (2017.01)
G06T 7/70 (2017.01)
G06V 10/25 (2022.01)
G06V 10/74 (2022.01)
G06V 10/82 (2022.01)

(52) U.S. Cl.
CPC ............ *G06T 17/00* (2013.01); *G06T 7/11* (2017.01); *G06T 7/70* (2017.01); *G06V 10/25* (2022.01); *G06V 10/761* (2022.01); *G06V 10/82* (2022.01); G06T 2207/10024 (2013.01); G06T 2207/10028 (2013.01); G06T 2207/20081 (2013.01)

(58) Field of Classification Search
CPC ... G06T 17/00; G06T 7/11; G06T 7/70; G06T 2207/10024; G06T 2207/10028; G06T 2207/20081; G06V 10/25; G06V 10/761; G06V 10/82

USPC ........................................................ 345/419
See application file for complete search history.

(56) References Cited

U.S. PATENT DOCUMENTS

| | | | |
|---|---|---|---|
| 6,990,228 B1* | 1/2006 | Wiles | G06T 7/55 348/42 |
| 10,460,511 B2* | 10/2019 | Ondruska | G06T 7/579 |
| 12,069,228 B2* | 8/2024 | Kaabi | G06T 5/77 |
| 2007/0250465 A1* | 10/2007 | Moden | G06T 7/593 706/18 |
| 2015/0178988 A1* | 6/2015 | Montserrat Mora | G06T 17/20 345/420 |
| 2015/0248764 A1* | 9/2015 | Keskin | G06V 10/7625 382/106 |

(Continued)

*Primary Examiner* — Sheree N Brown
(74) *Attorney, Agent, or Firm* — Ziegler IP Law Group, LLC.

(57) ABSTRACT

A system and method for receiving colour images, depth images and viewpoint information; dividing 3D space occupied by real-world environment into 3D grid(s) of voxels; create 3D data structure(s) comprising nodes, each node representing corresponding voxel; dividing colour image and depth image into colour tiles and depth tiles, respectively; mapping colour tile to voxel(s) whose colour information is captured in colour tile; storing, in node representing voxel(s), viewpoint information indicative of viewpoint from which colour and depth images are captured, along with any of: colour tile that captures colour information of voxel(s) and corresponding depth tile that captured depth information, or reference information indicative of unique identification of colour tile and corresponding depth tile; and utilising 3D data structure(s) for training neural network(s), wherein input of neural network(s) comprises 3D position of point and output of neural network(s) comprises colour and opacity of point.

35 Claims, 5 Drawing Sheets

(56) References Cited

U.S. PATENT DOCUMENTS

| | | | |
|---|---|---|---|
| 2018/0059679 A1* | 3/2018 | Taimouri | G06N 3/08 |
| 2018/0310025 A1* | 10/2018 | Keränen | G06T 17/005 |
| 2019/0279423 A1* | 9/2019 | Murray | G06F 30/23 |
| 2021/0049203 A1* | 2/2021 | Gupta | G06F 40/205 |
| 2022/0245910 A1* | 8/2022 | Lombardi | G06T 13/40 |
| 2024/0135644 A1* | 4/2024 | Strandborg | G06T 15/20 |

* cited by examiner

MULTIRESOLUTION TRUNCATED NEURAL RADIANCE FIELDS

TECHNICAL FIELD

The present disclosure relates to computer-implemented methods incorporating multiresolution truncated neural radiance fields or other similar neural networks. The present disclosure also relates to systems incorporating multiresolution truncated neural radiance fields or other similar neural networks. The present disclosure further relates to computer program products incorporating multiresolution truncated neural radiance fields or other similar neural networks.

BACKGROUND

With advancements in evolving technologies such as immersive extended-reality (XR) technologies, demand for high-quality image generation has been increasing. It is desired that the image generation is performed in real time or near-real time. Several advancements are being made to develop image generation techniques that facilitate high-quality and realistic three-dimensional (3D) reconstruction of a real-world environment. Some existing image generation techniques typically rely on environment reconstruction using 3D point clouds, 3D meshing, machine learning (ML)-based approaches (for example, such as Neural Radiance Fields (NeRFs)), image-based techniques, and the like.

However, existing techniques and equipment for implementing 3D reconstruction are associated with several limitations. Firstly, the existing techniques are inefficient in terms of managing a memory budget for storing data structures comprising information pertaining to a 3D space of the real-world environment. In such a case, when these data structures are employed as input for generating images from new viewpoints, image reconstruction is performed with considerable latency/delay. Moreover, when it is required to perform the image reconstruction in real time, the existing techniques cannot be scaled up to a high enough quality (namely, high image resolution) on the existing equipment. For example, an image resolution provided by a 3D data structure is limited by an underlying 3D voxel grid, making scaling to higher resolutions extremely expensive. This also adversely impacts viewing experiences provided by the evolving XR technologies which utilize the images generated using such data structures. Secondly, some existing techniques implement the 3D reconstruction, for example, using a static 3D mesh which cannot be updated easily. Thus, image reconstruction cannot be performed in real time or near-real time, and processing resources and time required for updating the static 3D mesh are considerably high. Furthermore, storing redundant object information into the data structures makes such data structures very bulky to use. Thirdly, some existing techniques are capable of real-time 3D reconstruction and rendering, but unfortunately suffers from inaccuracies and missing details in depth information. This causes extreme degradation of image quality in reconstructed images where accurate depth information is of utmost importance. Fourthly, even though neural networks like NeRF are capable of generating high quality images, they are not fast enough for real-time rendering of high-resolution images that are suitable for XR applications.

Therefore, in light of the foregoing discussion, there exists a need to overcome the aforementioned drawbacks associated with existing techniques and equipment for implementing 3D reconstruction.

SUMMARY

The present disclosure seeks to provide a computer-implemented method incorporating multiresolution truncated neural radiance fields or similar neural networks. The present disclosure also seeks to provide a system incorporating multiresolution truncated neural radiance fields or similar neural networks. The present disclosure further seeks to provide a computer program product incorporating multiresolution truncated neural radiance fields or similar neural networks. An aim of the present disclosure is to provide a solution that overcomes at least partially the problems encountered in prior art.

In a first aspect, an embodiment of the present disclosure provides a computer-implemented method comprising:
   receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
   dividing a 3D space occupied by the given real-world environment into at least one 3D grid of voxels, wherein the at least one 3D grid is represented in the given coordinate system;
   creating at least one 3D data structure comprising a plurality of nodes, each node representing a corresponding voxel of the 3D space occupied by the given real-world environment;
   dividing a given colour image and a given depth image corresponding to the given colour image into a plurality of colour tiles and a plurality of depth tiles, respectively, wherein the plurality of depth tiles correspond to respective ones of the plurality of colour tiles;
   mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;
   storing, in a given node of the at least one 3D data structure representing the at least one voxel, given viewpoint information indicative of the given viewpoint from which the given colour image and the given depth image are captured, along with any of:
   (i) the given colour tile of the given colour image that captures the colour information of the at least one voxel and the corresponding depth tile of the given depth image that captures the depth information of the at least one voxel,
   (ii) reference information indicative of unique identification of the given colour tile and the corresponding depth tile; and
   utilising the at least one 3D data structure for training at least one neural network, wherein a given input of the at least one neural network comprises information indicative of a 3D position of a given point in the given real-world environment and a given output of the at least one neural network comprises a colour and an opacity of the given point.

In a second aspect, an embodiment of the present disclosure provides a system comprising at least one server, wherein the at least one server is configured to:

receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;

divide a 3D space occupied by the given real-world environment into at least one 3D grid of voxels, wherein the at least one 3D grid is represented in the given coordinate system;

create at least one 3D data structure comprising a plurality of nodes, each node representing a corresponding voxel of the 3D space occupied by the given real-world environment;

divide a given colour image and a given depth image corresponding to the given colour image into a plurality of colour tiles and a plurality of depth tiles, respectively, wherein the plurality of depth tiles correspond to respective ones of the plurality of colour tiles;

map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;

store, in a given node of the at least one 3D data structure representing the at least one voxel, given viewpoint information indicative of the given viewpoint from which the given colour image and the given depth image are captured, along with any of:

(i) the given colour tile of the given colour image that captures the colour information of the at least one voxel and the corresponding depth tile of the given depth image that captures the depth information of the at least one voxel, (ii) reference information indicative of unique identification of the given colour tile and the corresponding depth tile; and utilise the at least one 3D data structure for training at least one neural network, wherein a given input of the at least one neural network comprises information indicative of a 3D position of a given point in the given real-world environment and a given output of the at least one neural network comprises a colour and an opacity of the given point.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

Embodiments of the present disclosure substantially eliminate or at least partially address the aforementioned problems in the prior art, and facilitate in fast and efficient training of neural network(s) by using a space-efficient 3D data structure that is based on image tiles, thereby enabling accurate and realistic generation of colours and opacities of points in the given real-world environment, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2B illustrates the colour image being divided into a plurality of colour tiles, while

DETAILED DESCRIPTION OF EMBODIMENTS

Figure 1:
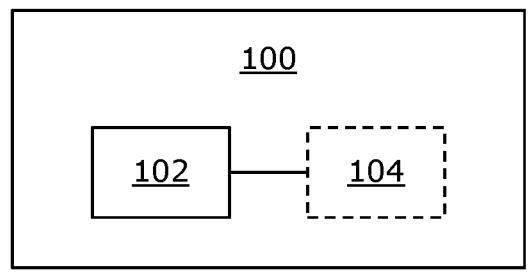
FIG. 1 illustrates a block diagram of an architecture of a system incorporating multiresolution truncated neural radiance fields, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:

receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;

dividing a 3D space occupied by the given real-world environment into at least one 3D grid of voxels, wherein the at least one 3D grid is represented in the given coordinate system;

creating at least one 3D data structure comprising a plurality of nodes, each node representing a corresponding voxel of the 3D space occupied by the given real-world environment;

dividing a given colour image and a given depth image corresponding to the given colour image into a plurality of colour tiles and a plurality of depth tiles, respectively, wherein the plurality of depth tiles correspond to respective ones of the plurality of colour tiles;

mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;

storing, in a given node of the at least one 3D data structure representing the at least one voxel, given viewpoint information indicative of the given viewpoint from which the given colour image and the given depth image are captured, along with any of:

(i) the given colour tile of the given colour image that captures the colour information of the at least one voxel and the corresponding depth tile of the given depth image that captures the depth information of the at least one voxel, (ii) reference information indicative of unique identification of the given colour tile and the corresponding depth tile; and utilising the at least one 3D data structure for training at least one neural network, wherein a given input of the at least one neural network comprises information indicative of a 3D position of a given point in the given real-world environment and a given output of the at least one neural network comprises a colour and an opacity of the given point.

In a second aspect, an embodiment of the present disclosure provides a system comprising at least one server, wherein the at least one server is configured to:

receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;

divide a 3D space occupied by the given real-world environment into at least one 3D grid of voxels, wherein the at least one 3D grid is represented in the given coordinate system;

create at least one 3D data structure comprising a plurality of nodes, each node representing a corresponding voxel of the 3D space occupied by the given real-world environment;

divide a given colour image and a given depth image corresponding to the given colour image into a plurality of colour tiles and a plurality of depth tiles, respectively, wherein the plurality of depth tiles correspond to respective ones of the plurality of colour tiles;

map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;

store, in a given node of the at least one 3D data structure representing the at least one voxel, given viewpoint information indicative of the given viewpoint from which the given colour image and the given depth image are captured, along with any of:

(i) the given colour tile of the given colour image that captures the colour information of the at least one voxel and the corresponding depth tile of the given depth image that captures the depth information of the at least one voxel, (ii) reference information indicative of unique identification of the given colour tile and the corresponding depth tile; and utilise the at least one 3D data structure for training at least one neural network, wherein a given input of the at least one neural network comprises information indicative of a 3D position of a given point in the given real-world environment and a given output of the at least one neural network comprises a colour and an opacity of the given point.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

The present disclosure provides the aforementioned method, the aforementioned system, and the aforementioned computer program product for facilitating fast and efficient training of the at least one neural network by using space-efficient 3D data structure that is based on image tiles, thereby enabling accurate and realistic generation of colours and opacities of (real-world) points in the given real-world environment, in real time or near-real time. The method enables in creating the at least one 3D data structure that is space-efficient and is susceptible to be used for reconstructing images from various new viewpoints. This is particularly the case when the reference information pertaining to colour tiles and depth tiles is stored in the nodes of the at least one 3D data structure, rather than storing the colour tiles and the depth tiles therein. This makes the method and the system more memory-efficient, as compared to the prior art. Moreover, the reference information does not include any redundancy, and can be updated easily in the at least one 3D data structure. The method can be easily scaled up to a high enough quality on existing equipment. Training the at least one neural network in a manner described in the present disclosure requires considerably lesser processing resources and time. Furthermore, upon training the at least one neural network, volume rendering can be performed by the at least one neural network for achieving high image quality in reconstructed images along with compensating for inaccuracies and missing details in depth information. The method and the system are simple, robust, support real-time high-quality 3D reconstruction, and can be implemented with ease.

Notably, the at least one server controls an overall operation of the system. In some implementations, the at least one server is implemented as a remote server. In such implementations, the remote server receives the plurality of colour images and the plurality of depth images from at least one data repository, or from a device comprising at least one camera. In an example, the remote server could be a cloud server that provides a cloud computing service. Examples of the device include, but are not limited to, a head-mounted display (HMD) device and a teleport device. In other implementations, the at least one server is implemented as a processor of the device comprising the at least one camera or as a processor of a computing device communicably coupled to the device.

Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation, is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to divide the three-dimensional (3D) space occupied by the given real-world environment into the at least one 3D grid of voxels, and a second server from amongst the plurality of servers may be configured to map the given colour tile to the at least one voxel whose colour information is captured in the given colour tile.

Optionally, the system further comprises the at least one data repository that is communicably coupled to the at least one server. Optionally, the at least one data repository stores the at least one 3D data structure. It will be appreciated that the at least one data repository could be implemented, for example, such as a memory of the at least one server, a memory of the device, a memory of the computing device, a removable memory, a cloud-based database, or similar.

Throughout the present disclosure, the term "camera" refers to an equipment that is operable to detect and process light signals received from the given real-world environment, so as to capture image(s) of the given real-world environment. Such images could be colour images and/or depth images of the given real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR)) camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LIDAR) camera, a Time-of-Flight (ToF) camera, a Sound Navigation and Ranging (SONAR) camera, a laser rangefinder, a stereo camera, a plenoptic camera, and an infrared (IR) camera.

In some implementations, both the given colour image and the given depth image are captured using a single camera. As an example, the aforesaid images may be captured as an RGB-D image using the single camera. In other implementations, the given colour image and the given depth image are captured separately by using separate cameras. As an example, the given colour image may be captured by an RGB camera, while the given depth image may be captured by a ToF camera. In yet other implementations, the given colour image is captured using at least one visible-light camera, and the given depth image is generated (for example, by the at least one server) using one of:
  stereo disparity between a stereo pair of visible-light images captured by the at least one visible-light camera,
  a 3D model of the given real-world environment and a viewpoint of the at least one camera, the 3D model being a data structure comprising comprehensive information pertaining to the 3D space of the given real-world environment.

It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the given depth image could be generated even without using the depth camera. In this regard, the given depth image could be generated by using a monocular depth estimation technique, wherein a single (monocular) RGB image is used for estimating depth values to generate the given depth image.

It is to be understood that the given colour image is a visual representation of the given real-world environment. The term "visual representation" encompasses colour information represented in the given colour image, and additionally optionally other attributes associated with the given colour image (for example, such as depth information, luminance information, transparency information, and the like). Optionally, the colour information represented in the given colour image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

Furthermore, the term "depth image" refers to an image comprising information pertaining to optical depths of objects or their parts present in the given real-world environment. In other words, the depth image provides information pertaining to distances (namely, the optical depths) of surfaces of the objects or their parts from a given viewpoint and a given viewing direction of the at least one camera. In an example, the depth image could be an image comprising a plurality of pixels, wherein a pixel value of each pixel in said image indicates an optical depth of its corresponding real point/region within the given real-world environment. The term "object" refers to a physical object or a part of the physical object present in the given real-world environment. The object could be a living object (for example, such as a human, a pet, a plant, and the like) or a non-living object (for example, such as a wall, a window, a toy, a poster, a lamp, and the like).

Throughout the present disclosure, the term "viewpoint" encompasses both a viewing position at which the at least one camera is positioned in the given real-world environment as well as a viewing direction in which the at least one camera is capturing the given colour image and the given depth image. It will be appreciated that multiple objects or their parts present in the given real-world environment span across a field of view of the at least one camera; therefore, for the given colour image that is captured from a given viewpoint, light reflecting off these objects or their parts is incident upon a sensor chip of the at least one camera at different incident angles. As an example, when an angular width of a horizontal field of view of the at least one camera is 90 degrees, these objects or their parts are captured in the given colour image such that information pertaining to the objects or their parts is captured from −45 degrees to +45 degrees from a centre of the horizontal field of view. Thus, a given viewpoint from which a given object or its part is captured not only depends on the viewing position and the viewing direction of the at least one camera, but also depends on which portion of the field of view of at least one camera is the given object or its part captured.

Optionally, the system further comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, a processor of the device is configured to process tracking data, collected by the tracking means, for tracking the viewpoints of the at least one camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the at least one camera is arranged on the device present in the given real-world environment. Such a device could be arranged at a fixed location within the given real-world environment. Optionally, in such a case, the device is stationary in the given real-world environment. Additionally or alternatively, the device could be a wearable device being worn by a user present in the given real-world environment. In such a case, a location of the device changes with a change in a location of its user. Likewise, the device could be arranged on, for example, a drone, a robot, or similar. As an example, the device could be arranged on a support structure that is capable of a 3D rotation (and additionally, capable of a translation motion). The support structure can be moved to any required location in the given real-world environment. In some implementations, a plurality of such devices may employ peer-to-peer (P2P) computing for implementing the aforementioned method of the present disclosure.

Beneficially, the at least one camera is movable in the given real-world environment, so as to capture the plurality of colour images and the plurality of depth images from a plurality of viewpoints. In this regard, a pose of the at least one camera changes i.e., at least an orientation of the at least one camera changes with respect to time. It will be appreciated that at least the orientation of the at least one camera may be adjusted (namely, changed) by using a motorised actuator. In such a case, information pertaining to at least the orientation of the at least one camera can be accurately known to the at least one server. The actuator may be driven by an actuation signal, for example, such as a piezoelectric force, an electromagnetic force, a mechanical torque, an electric current, or similar. Notably, different poses of the at least one camera serve as different (known) viewpoints for capturing the plurality of colour images and the plurality of depth images. The term "pose" encompasses both a position and an orientation. A 3D orientation of a given viewpoint corresponds to a direction of a depth axis of a given image from a 3D position of the at least one camera.

Notably, the given coordinate system defines a position and an orientation of a given viewpoint (from which the given colour image and the given depth image are captured) within the 3D space of the given real-world environment. As an example, the given coordinate system may be a Cartesian coordinate system. Optionally, the given coordinate system has a predefined origin and three mutually perpendicular coordinate axes. The three mutually perpendicular coordinate axes could be, for example, X, Y, and Z axes. Optionally, in this regard, a 3D position of the given viewpoint in the given coordinate system is expressed as (x, y, z) position coordinates along the X, Y and Z axes, respectively. Likewise, an orientation of the given viewpoint in the given coordinate system could be expressed, for example, using rotation quaternions, Euler angles, rotation matrices, and the like.

Throughout the present disclosure, the term "voxel" refers to a 3D volumetric element that constitutes a portion of the 3D space occupied by the given real-world environment. Multiple voxels can be employed to represent the 3D space occupied by the given real-world environment. A given voxel corresponding to the portion of the 3D space represents colour information pertaining to the portion of the 3D space, and additionally optionally other attributes associated with the portion of the 3D space (for example, such as depth information, luminance information, transparency information, opacity information, and the like). The given voxel can be considered to be a 3D equivalent of a pixel. A shape of the given voxel could be a cube, a cuboid or some other convex polyhedron. Voxels are well-known in the art.

Optionally, the at least one server is configured to divide the 3D space into the at least one 3D grid of voxels using a space partitioning scheme. Examples of the space partitioning scheme include, but are not limited to, an Octree (including a Sparse Voxel Octree) Partitioning scheme, a Binary Space Partitioning (BSP) scheme, a Quadtree Partitioning scheme, a k-dimensional tree partitioning scheme, a bounding volume hierarchy (BVH) partitioning scheme, and a voxel hashing scheme. The at least one 3D grid of voxels enables in effectively modelling the 3D space of the given real-world environment. The technical benefit of representing the at least one 3D grid in the given coordinate system is that a location of the given voxel in the at least one 3D grid can be easily identified by the at least one server. It will be appreciated that the at least one 3D grid of voxels may be a regular 3D grid or an irregular 3D grid. However, the regular 3D grid is relatively easier to employ as compared to the irregular 3D grid because tessellation of the regular 3D grid is regular.

It will be appreciated that a number of nodes in the at least one 3D data structure is equal to a number of voxels of the 3D space. Moreover, a given 3D region in the 3D space (represented by at least one voxel) may correspond to more than one node of the at least one 3D data structure. Examples of the at least one 3D data structure include, but are not limited to, an octree, a Binary Space Partitioning (BSP) tree, a Quadtree, a bounding volume hierarchy (BVH), and hashed voxels. Creating the at least one 3D data structure is well-known in the art.

Optionally, a given node of the at least one 3D data structure is an oriented bounding box (OBB). Herein, the term "oriented bounding box" refers to a type of a bounding box that is inclined (namely, oriented) at a particular angle. Such a bounding box may, for example, have a cubic shape, a cuboidal shape, or some other convex polyhedral shape. The bounding box and its types are well-known in the art. The OBB may correspond to an oblique object or its part present in the 3D space of the real-world environment. The technical benefit of using the OBB as the given node is that (objects or their parts present in) the 3D space of the real-world environment can be represented in a highly space-efficient manner. This may be because redundant representation of 3D regions in the 3D space is considerably minimized by employing the OBB as the given node. It will be appreciated that the given node of the at least one 3D data structure could also be an axis-aligned bounding box (AABB), a discrete oriented polytope (DOP), or similar.

Throughout the present disclosure, the term "tile" of a given image refers to a segment of the given image. It will be appreciated that a given tile of the given image has a defined shape and/or size. In an example, a size of the given tile may be 32×32 pixels. In another example, a size of the given tile may be 50×100 pixels.

Notably, the given colour image and the given depth image are divided into the plurality of colour tiles and the plurality of depth tiles, respectively, in a manner that a number of colour tiles is equal to a number of depth tiles. In other words, a grid of colour tiles of the given colour image exactly matches with a grid of depth tiles of the given depth image both in a horizontal direction and a vertical direction. In this regard, colour information represented in the given colour tile and depth information represented in the given depth tile correspond to a same real-world region. Optionally, when dividing the given colour image and the given depth image, the at least one server is configured to employ at least image processing algorithm. Optionally, the at least image processing algorithm is at least one of: an image slicing algorithm, an image cropping algorithm, an image segmentation algorithm.

In some implementations, a resolution of the given colour image is same as a resolution of the given depth image. In this regard, a number of pixels in the given colour tile and a number of pixels in the given depth tile are same. In other implementations, a resolution of the given colour image is different from a resolution of the given depth image. Optionally, the resolution of the given colour image is greater than the resolution of the given depth image. In this regard, the number of pixels in the given colour tile are greater than the number of pixels in the given depth tile.

Notably, when mapping the given colour tile to the at least one voxel, the at least one voxel is associated with (namely, linked to) the given colour tile as the colour information of the at least one voxel is captured in the given colour tile. Since optical depths (i.e., the depth information) in the corresponding depth tile of the given depth image and (a 3D position and an orientation of) the given viewpoint are known, the at least one server can easily and accurately ascertain voxel(s) in the at least one 3D grid to which the given colour tile is to be mapped. Therefore, the at least one server ascertains a location of the at least one voxel in the at least one 3D grid whose colour information is captured in the given colour tile. In this regard, at least one of: coordinate geometry-based formula, trigonometry-based formula is employed for determining the location of the at least one voxel in the at least one 3D grid.

Upon mapping the given colour tile to the at least one voxel, the given node of the at least one 3D data structure is populated with the viewpoint information corresponding to the given colour image and the given depth image and any of: the reference information, or the given colour tile and the corresponding depth tile. In some implementations, the given node does not actually store the given colour tile and the given depth tile, but instead stores only the reference information, which provides a unique identification of the given colour tile and the given depth tile. Beneficially, this facilitates in saving space at the at least one data repository in which the at least one 3D data structure is stored. Moreover, image reconstruction can be performed photo-realistically in real time or near-real time, and in a band-width-efficient manner using the at least one 3D data structure. Furthermore, storing the viewpoint information is also beneficial since the viewpoint information is utilized for selecting at least one colour tile and at least one depth tile at the time of training the at least one neural network using the at least one 3D data structure.

It will be appreciated that the given colour image and the given depth image could be identified using a running number index of the given colour image and of the given depth image, respectively. Optionally, the unique identification of the given tile (namely, the given colour tile of the given colour image and/or the given depth tile of the given depth image) comprises any one of:
- position coordinates of at least one of four corners of the given tile of the given image,
- a row number and a column number of the given tile of the given image,
- position coordinates and dimensions in an atlas image, when tiles of the given image are packed into the atlas image.

As an example, when the tiles are equi-sized, position coordinates of only one corner, for example, a left upper corner of the given tile is required for the unique identification. It will be appreciated that information pertaining to the row number and the column number of the given tile may require lesser number of bits, as compared to position coordinates. Hereinabove, the term "atlas image" refers to a type of image in which the colour tiles and the depth tiles are arranged (namely, packed), for example, in a space-efficient manner.

Notably, the at least one neural network is trained by using the at least one 3D data structure. Since nodes of the at least one 3D data structure comprise the viewpoint information corresponding to the given colour image and the given depth image along with any of: the reference information, or the colour tiles and the depth tiles, the at least one 3D data structure is served as a training dataset to the at least one neural network. This is because the at least one 3D data structure comprises comprehensive information pertaining to the 3D space of the real-world environment. During the aforesaid training, the at least one neural network learns from the comprehensive information in the at least one 3D data structure in order to be able to map the given input to the given output. Neural networks and their training is well-known in the art.

It will be appreciated that the given input may also include other parameters, in addition to the information indicative of the 3D position of the given point in the given real-world environment. Optionally, in this regard, the given input of the at least one neural network further comprises a given viewing direction. In such a case, the given output comprises the colour of the given point with respect to the given viewing direction. In other words, the colour of the given point would be a view-dependent colour (or view-dependent irradiance at the given point).

Optionally, the at least one neural network is implemented as a Neural Radiance Field (NeRF) model. Typically, the NeRF model is a deep fully-connected neural network (namely, a machine learning-based model) without any convolutional layers (also referred to as a multilayer perceptron (MLP)). It will be appreciated that when the NeRF model is employed, the given input comprises the information indicative of the 3D position as well as the given viewing direction, and the given output comprises the view-dependent colour and the opacity of the given point. Such a NeRF model is described, for example, in *"NeRF: representing scenes as neural radiance fields for view synthesis"* by Ben Mildenhall et al., published in Proceedings of the European Conference on Computer Vision (ECCV), 2020, which has been incorporated herein by reference. It will be appreciated that any type of neural network (upon training) that could reproduce the given real-world environment, either via novel-view synthesis or by producing a 3D mesh or point cloud can be implemented.

In an example, when the at least one neural network is implemented as the NeRF model, using the aforementioned reference for sake of clarity and convenience, the colour of the given point can be mathematically expressed as:

$$C(r) = \int_{tn}^{tf} T(t)\sigma(r(t))c(r(t), d)dt$$

wherein
C(r) is the colour of the given point,
T(t) is an intensity of light that has been blocked till a point 't',
σ(r(t)) is density at the point 't',
c(r(t),d) is colour at a point r(t) with respect to a viewing angle 'd',
tn is an upper bound for a given ray, and
tf is a lower bound for the given ray.

Optionally, the information indicative of the 3D position of the given point is in form of a 3D position in the given coordinate system. Such a 3D position can be represented as (x, y, z) position coordinates along the X, Y and Z axes, respectively. Additionally, when the at least one neural network is implemented as the NeRF model, the aforesaid information could, for example, be represented as (x, y, z, θ, φ), wherein (x, y, z) are the position coordinates as mentioned above, and (θ, φ) are orientation angles with respect to any two of the aforesaid axes. In case of the NeRF model, the position coordinates and the orientation angles correspond to extrinsic parameters of the at least one camera.

Furthermore, optionally, the colour of the given point is represented by a colour value. Such a colour value could, for example, be an RGB value, an RGB-A value, a CMYK value, a YUV value, an RGB-D value, an HCL value, an HSL value, an HSB value, an HSV value, an HSI value, a YCbCr value, or similar. Optionally, the opacity of the given point is represented by an alpha value. Alpha values are well-known in the art. Greater the alpha value, greater is the opacity of the given point, and lower is the transparency of the given point, and vice versa. In addition to this, greater the opacity of the given point, greater is the density of the given point. A non-zero density of the given point means that the given point in the 3D space could be occupied by an opaque object or its part. It is to be understood that when the opacity of the given point is zero or nearly zero, it means the 3D region in the 3D space could either be empty (i.e., surrounded by air), or be occupied by a transparent object or its part.

It will be appreciated that the given input to the at least one neural network could be encoded to facilitate the at least one neural network for determining features of an object or its part present in the 3D space at different resolutions. Such an encoding is well-known in the art, and thus could be performed using well-known arithmetic approaches (for example, such as frequency encoding), or could be implemented as a part of training the at least one neural network (for example, by positional encoding, sparse grid embeddings, or any other similar technique).

Optionally, the step of utilising the at least one 3D data structure comprises:
processing depth information in depth tiles whose reference information is stored in the plurality of nodes of the at least one 3D data structure, based on respective viewpoints from which corresponding depth images are captured, to generate a 3D depth model of the given real-world environment;
determining, from the 3D depth model, an optical depth of a pixel corresponding to a given ray from a 3D position of a given viewpoint, based on a direction of the given ray;
selecting a lower bound and an upper bound for the given ray, based on the determined optical depth of the pixel; and
during training of the at least one neural network:
marching the given ray within the lower bound and the upper bound, or
forcing an opacity function of the at least one neural network to return a zero value for any sample point on the given ray before the lower bound.

Optionally, when processing the depth information to generate the 3D depth model, the at least one server is configured to employ at least one data processing algorithm. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. Optionally, the 3D depth model is in form of at least one of: a 3D point cloud, a 3D polygonal mesh, a 3D surface cloud, a voxel-based model. The 3D polygonal mesh could, for example, be a 3D triangular mesh or a 3D quadrilateral mesh.

It will be appreciated that the depth information in the depth tiles is processed based on the respective viewpoints to enable the at least one server to utilize the optical depths of the objects or their parts when generating the 3D depth model. In such a case, the 3D depth model is accurately and realistically generated, because information pertaining to the optical depths in the given real-world environment is accurately known, to the at least one server, in great detail from various perspectives of the at least one camera that captured the depth images. Thus, the 3D depth model would also be indicative of placements, geometries, occlusions, and the like, of the objects or their parts from said various perspectives.

Since 3D positions of points in the given real-world environment are known from the 3D depth model and the 3D position of the given viewpoint (namely, a 3D position of the at least one camera) is also known, the optical depth of the pixel can be easily and accurately determined by finding a given point that lies on the given ray and that is nearest to the 3D position of the given viewpoint. In such a case, it is assumed that the given ray originates from the given viewpoint.

It will be appreciated that a (single) given colour image has multiple rays (corresponding to respective pixels of the given colour image) whose directions are different from each other, because said multiple rays span across an entire field-of-view of the at least one camera. In other words, the given ray for the aforesaid pixel corresponds to a direction pointing from the 3D position of the given viewpoint towards the corresponding point that is represented by the pixel. Optionally, the at least one server is configured to determine the direction of the given ray for the aforesaid pixel, based on the 3D position of the given viewpoint, at least one intrinsic parameter of the at least one camera, and pixel coordinates of the pixel in the given image. Beneficially, for each pixel in the given image, a direction of a corresponding ray can be determined easily and accurately, and thus there would not be any need to store additional ray direction information in the given node of the at least one 3D data structure. The at least one intrinsic parameter of the at least one camera could, for example, comprise at least one of: the field-of-view, a focal length, an aperture, a resolution, of the at least one camera.

Once the optical depth of the pixel is determined, the given ray, for example, is to be marched in between two particular bounds (namely, two particular limits) for training the at least one neural network. In this regard, the lower bound and the upper bound for the given ray are selected according to the determined optical depth of the pixel. For example, the lower bound may be equal to a value lesser than the determined optical depth by a predefined percentage, whereas the upper bound may be equal to a value greater than the determined optical depth by the predefined percentage. Such a predefined percentage may, for example, be defined by taking into account error margins in the depth information, as described later.

In one case, the lower bound and the upper bound define a distance between which the given ray is to be marched for training the at least one neural network. In other words, the given ray is marched through voxels in the at least one 3D grid that lie on a path of the given ray. Thus, the colour and the opacity of a given point (that lies on the given ray) can be known to the at least one server from node(s) (of the at least one 3D data structure) in which any of: colour tiles and depth tiles, or reference information corresponding to said voxel(s) are stored. Ray marching is well-known in the art. It will be appreciated that such a ray marching is typically performed at a granularity level of the at least one neural network that is considerably finer than a granularity level of the at least one 3D grid. The voxels may, for example, be cubes of 10 centimetres, and may only be employed for indexing visual representation of the colour tiles. A step size for the ray marching may be dependent on an implicit resolution of the at least one neural network. It will be appreciated that instead of performing ray marching for each pixel for an entire length of optical depths, a starting point of the ray marching is truncated to the lower bound for the given ray. Beneficially, the training of the at least one neural network is fast, more accurate, and reliable.

In another case, the lower bound for the given ray is used for determining an opacity of a given sample point on the given ray to be zero, when the given sample point lies before the lower bound. This is because when the opacity of the given sample point (lying before the lower bound) is non-zero, it means that some density is present at the given sample point (for example, due to some opaque object or its part). Thus, the (currently selected) lower bound is inaccurate and unreliable for training the at least one neural network, and thus may be modified accordingly. Therefore, it is ensured that the opacity function would return the zero value for any sample point on the given ray before the lower bound. The term "opacity function" refers to a mathematical function used for determining the opacity (namely, a density) of the given sample point on the given ray.

Optionally, the lower bound and the upper bound for the given ray are selected, further based on error margins in the depth information. In a case where the depth images are captured using a depth sensor of the at least one camera, it is likely that there could be some error (namely, uncertainty) in the depth information and thus in the (generated) 3D depth model of the given real-world environment. Therefore, in order to take into account such a depth uncertainty, the lower bound is selected by subtracting an error margin from the determined optical depth of the pixel, while the upper bound is selected by adding an error margin to the determined optical depth of the pixel. Such an error margin may, for example, be a predefined percentage of the determined optical depth, a fixed depth value (for example, in millimetres, centimetres, or metres), or similar. The error margins depend on specifications of the depth sensor. Beneficially, selecting the lower bound and the upper bound in this manner facilitates in performing any one of the two aforementioned steps during the training of the at least one neural network accurately and reliably. In an example, the determined optical depth of the pixel may be 10 meters, and an error margin may be 5 percent of the determined optical depth. Thus, the lower bound and the upper bound are selected as 9.5 meters and 10.5 meters, respectively.

Additionally or alternatively, optionally, the step of utilising the at least one 3D data structure further comprises determining, from the 3D depth model, optical depths of neighbouring pixels corresponding to neighbouring rays of the given ray from the 3D position of the given viewpoint, based on directions of the neighbouring rays,
wherein the lower bound and the upper bound for the given ray are selected, further based on the determined optical depths of the neighbouring pixels.

In this regard, since the optical depths of the 3D points in the given real-world environment, the 3D position of the given viewpoint, and a direction of a ray corresponding to each pixel in a given image are already known, the optical depths of the neighbouring pixels can be easily and accurately ascertained by the at least one server, in a similar manner as described earlier with respect to the pixel corresponding to the given ray. It is to be understood that the neighbouring pixels are those pixels that are located in close vicinity of the pixel corresponding to the given ray in the given image. Thus, the neighbouring pixels may lie within a predefined threshold angle and/or within a predefined threshold area from (a location of) the pixel corresponding to the given ray.

When two or more objects appear to be in vicinity in the given image, but said objects actually have different optical depths, features (such as edges) of said objects may have been misinterpreted by the depth sensor, and thus their optical depths might be erroneously captured in a depth image. Therefore, when the lower bound and the upper bound are selected based on the determined optical depths of the neighbouring pixels, marching of the given ray for training the at least one neural network can be performed more accurately and reliably. Resultantly, it can be ensured that the features of the objects or their parts can be well-recognised by the at least one (trained) neural network, and thus can be well-represented in images subsequently rendered using the at least one (trained) neural network.

In an example, the determined optical depth of the pixel may be 5 meters, determined optical depths of two neighbouring pixels may be 4 meters and 6 meters, respectively, and an error margin for each pixel may be 0.5 meters. Thus, the lower bound and the upper bound are selected as 3.5 meters and 6.5 meters, respectively. In another example, even when the error margin is not provided, the lower bound and the upper bound can still be selected as 4 meters and 6 meters, respectively.

It will be appreciated that optical depths of some pixels may be entirely missing from the depth information in the depth tiles. In such a case, the marching of the given ray may be performed through entire optical depths of a given real-world scene, as no prior information about a range of depths is available. For training the at least one neural network, such missing pixels can also be either skipped altogether in the marching or may be selected at lower probability on an assumption that optical depths of real-world regions corresponding to these pixels would be captured by some other depth tiles. Moreover, in practice, optical depths of such missing pixels are still likely to reside in the neighbouring pixels. Thus, selection of the lower bound and the upper bound can be done based on the determined optical depths of the neighbouring pixels. Furthermore, the at least one server may store the lower bound and the upper bound for the given ray as separate depth values per pixel or per block of pixels, based on evaluating the opacity function of the at least one neural network over a given ray corresponding to each pixel. In this regard, a range between the lower bound and the upper bound within which the marching is to be performed may be represented as a signed distance field (SDF) instead of a height map. Such an SDF may be stored in each depth tile or in each node of the at least one 3D data structure.

Optionally, the step of utilising the at least one 3D data structure further comprises factoring the upper bound into a loss function employed in the at least one neural network. In this regard, the upper bound is utilised by the loss function even when the lower bound for the given ray is optionally considered to be zero. The upper bound is necessary for accurately determining the colour of the given point, in resource-efficient and time-efficient manner. This is because the marching of the given ray is restricted to the upper bound which otherwise would have been continued indefinitely. Moreover, the phrase "factoring the upper bound into the loss function" simply means that a colour rendering equation employed by the at least one neural network is modified for utilising the selected upper bound. By utilising the selected upper bound, it is intended that losses or errors in colour rendering is minimum. Assuming relatively accurate depth information in the depth tiles, the density evaluated by the at least one neural network must approach unity as the upper bound is reached while marching of the given ray.

Further, the term "loss function" refers to a mathematical function used for determining an overall squared error between a ground truth colour of a given point in the given real-world environment and estimated colours of the given point obtained from coarse rendering and fine rendering. For the coarse rendering, sample points on the given ray are coarser, i.e., sparsely located from each other and thus a distance between two consecutive sample points is considerable large. In such a rendering, the sample points could be equi-distant, irrespective of densities in the path of the given ray. On the other hand, for the fine rendering, sample points on the given ray are finer i.e., closely located with respect to each other and thus a distance between two consecutive sample points is considerable smaller. In such a rendering, the sample points could be hierarchically sampled, according to the densities in the path of the given ray. Higher number of sample points are selected for a part of the given ray having a higher density, as compared to a remaining part of the given ray having a relatively lower density.

In an example, when the at least one neural network is implemented as the NeRF model, using the aforementioned reference for sake of clarity and convenience, the loss function can be mathematically expressed as:

$$L = \sum_{r=R} \|Cc(r) - C(r)\|_2^2 + \|Cf(r) - C(r)\|_2^2$$

wherein

L is the loss function,

R is a set of rays corresponding to multiple points,

C(r) is the ground truth colour of the given point,

Cc(r) is the colour of the given point obtained from the coarse rendering, and

Cf(r) is the colour of the given point obtained from the fine rendering.

In an embodiment, the step of marching comprises:

determining a set of non-empty nodes of the at least one 3D data structure whose corresponding voxels lie on a path of the given ray within the lower bound and the upper bound;

determining, for each colour tile whose reference information is stored in a given non-empty node of the set, a respective direction pointing from a 3D position of a respective viewpoint towards a corresponding voxel of the given non-empty node;

selecting, from amongst colour tiles and depth tiles whose respective reference information is stored in the given non-empty node of the set, at least one colour tile and at least one corresponding depth tile whose determined direction matches the given ray most closely; and marching the given ray within the lower bound and the upper bound during training of the at least one neural network, by utilising the at least one colour tile and the at least one corresponding depth tile selected for the given non-empty node.

In this regard, since the path of the given ray is defined by an equation of a line in a same coordinate system as that of the at least one 3D grid of voxels, it can be easily and accurately known which voxels lie on the path of the given ray. The term "non-empty node" refers to a node of the at least one 3D data structure whose corresponding voxel has a physical object (or its part) present therein, and therefore, a density inside its corresponding voxel is non-zero. It will be appreciated that a non-empty voxel corresponds to a node having any of: one or more colour tiles that are mapped to the non-empty voxel, or reference information of the one or more colour tiles. Until the at least one neural network is trained upon the marching, (valid) opacity values (namely, density values) for the non-empty voxel remain to be unavailable. Upon training, there could be multiple opacity values for the non-empty voxel, and such values may be encoded by the at least one neural network, optionally at a finer resolution than a resolution of the at least one 3D grid of voxels. Moreover, the term "empty node" refers to a node whose corresponding voxel has no physical object (namely, has just air), and therefore, a density inside its corresponding voxel is zero.

Furthermore, when a direction pointing from a 3D position of a given viewpoint towards a corresponding voxel of the at least one colour tile significantly matches with the given ray, the at least one colour tile and the at least one corresponding depth tile are determined to be useful for training the at least one neural network. This means that for the given ray, only the aforesaid colour tile and depth tile represent relevant and precise information required for training the at least one neural network. Therefore, the given ray is marched by utilising the aforesaid tiles as they provide relevant and suitable colour values and depth values (of their pixels) for training the at least one neural network.

In another embodiment, the step of utilising the at least one 3D data structure comprises:
   determining a set of non-empty nodes of the at least one 3D data structure whose corresponding voxels lie on a path of a given ray;
   determining, for each colour tile whose reference information is stored in a given non-empty node of the set, a respective direction pointing from a 3D position of a respective viewpoint towards a corresponding voxel of the given non-empty node;
   selecting, from amongst colour tiles and depth tiles whose respective reference information is stored in the given non-empty node of the set, at least one colour tile and at least one corresponding depth tile whose determined direction matches the given ray most closely; and
   training the at least one neural network using the at least one selected colour tile and the at least one corresponding depth tile.

In this regard, training of the at least one neural network can be directly performed using the at least one selected colour tile and the at least one corresponding depth tile, without any need for performing marching of the given ray within the lower bound and the upper bound (as described in the previous embodiment). This is because once a direction pointing from a 3D position of a given viewpoint towards a corresponding voxel of the at least one colour tile significantly matches with the given ray, colour values and corresponding depth values from the at least one selected colour tile and the at least one corresponding depth tile are sufficient for training the at least one neural network. Beneficially, training the at least one neural network in this way requires considerably lesser processing resources and lesser processing time. Moreover, the at least one neural network would be trained in relatively lesser amount of time, would be independently employed (namely, standalone) without necessarily requiring the at least one 3D grid of voxels. This may be due to the fact that the marching of the given ray would now be skipped entirely, and there would not be any need for employing the aforementioned loss function by the at least one neural network.

In an example, training the at least one neural network in this way may particularly be beneficial for a scenario where it can be known from the depth information that certain regions of the given real-world environment are empty (i.e., do not represent any physical object or its part), and thus its information can be served as training dataset for the at least one neural network. In addition to this, colour and depth information pertaining to remaining non-empty regions of the given real-world environment can also be directly fed to the at least one neural network for its training. The steps of determining the set of non-empty nodes, determining the respective direction, and selecting the at least one colour tile and the at least one corresponding depth tile are determined in a same way as described earlier (in the previous embodiment).

In yet another embodiment, the step of utilising the at least one 3D data structure comprises:
   determining a set of non-empty nodes of the at least one 3D data structure whose corresponding voxels lie on a path of a given ray;
   identify a first non-empty node in said set at which the given ray enters;
   determining, for each colour tile whose reference information is stored in the first non-empty node, a respective direction pointing from a 3D position of a respective viewpoint towards a corresponding voxel of the first non-empty node;
   selecting, from amongst colour tiles and depth tiles whose respective reference information is stored in the first non-empty node, at least one colour tile and at least one corresponding depth tile whose determined direction matches the given ray most closely;
   determining, from the at least one selected colour tile and the at least one corresponding depth tile, a colour, an opacity and an optical depth of a pixel corresponding to the given ray, based on a direction of the given ray; and
   training the at least one neural network using the determined colour, the determined opacity and the determined optical depth of the pixel corresponding to the given ray.

In this regard, the first non-empty node in said set at which the given ray enters can be easily identified as it is known which voxels in the at least one 3D gird lie on the path of the given ray. It will be appreciated the first non-empty node is identified because it is highly likely that voxel(s) corresponding to the first non-empty node (i.e., a front-most non-empty node) is/are visible from the 3D position of the given viewpoint. The set of non-empty nodes is determined in a same manner as described earlier. Once the first non-empty node is identified, the step of determining the respective direction and the step of selecting the at least one colour tile and the at least one corresponding depth tile are performed in a same manner as described earlier (with respect to the given non-empty node).

It is to be understood that when the given ray enters the first non-empty node, the given ray crosses the at least one selected colour tile particularly at the pixel that lies in the direction of the given ray. Therefore, the at least one server can easily and accurately ascertain the colour and the opacity of said pixel from the at least one selected colour tile, and the optical depth of said pixel can be ascertained from the at least one corresponding depth tile. It will be appreciated that training the at least one neural network can be performed accurately using the aforesaid parameters, as the given input of the at least one neural network (i.e., the 3D position of the given viewpoint) can be known using the optical depth of said pixel and the given ray, and the given output of the at least one neural network is now known to the at least one neural network as the colour and the opacity of said pixel.

Optionally, the method further comprises utilising the at least one 3D data structure to render images with the at least one neural network. In this regard, in order to render images with the at least one neural network (upon its training), a colour and an opacity corresponding to each pixel of a given image are to be determined using the at least one neural network. In other words, colours and opacities of different pixels corresponding to different rays that span across the entire field-of-view of the at least one camera from a 3D position of a given viewpoint are estimated by the at least one neural network using the at least one 3D data structure. There will now be discussed on how the at least one 3D data structure is utilised for rendering the images.

Optionally, in the method, the step of utilising the at least one 3D data structure comprises:
  processing depth information in depth tiles whose reference information is stored in the plurality of nodes of the at least one 3D data structure, based on respective viewpoints from which corresponding depth images are captured, to generate a 3D depth model of the given real-world environment;
  determining, from the 3D depth model, an optical depth of a pixel corresponding to a given ray from a 3D position of a given viewpoint, based on a direction of the given ray;
  selecting a lower bound and an upper bound for the given ray, based on the determined optical depth of the pixel; and marching the given ray within the lower bound and the upper bound to render a given image with the at least one neural network.

In this regard, marching of the given ray is performed in order to obtain a colour and an opacity of the pixel corresponding to the given ray. When different rays originating from the 3D position of the given viewpoint are marched in this manner, colours and opacities of the different pixels corresponding to the different rays can be easily estimated for rendering the given image. Such a ray marching is same as the marching that was performed at a time of training the at least one neural network. The steps of processing the depth information to generate the 3D depth model, determining the optical depth of the pixel, and selecting the lower bound and the upper bound have already been discussed earlier in detail. Beneficially, ray marching for volume rendering performed in this way is relatively simple, easy, and takes lesser time as compared to ray marching for volume rendering performed in the prior art. Moreover, such ray marching also eliminates formation of cloud-like foreground artifacts, that are unavoidable with the prior art. It will be appreciated that even for rendering the given image, marching of the given ray only needs to be performed within the lower bound and the upper bound. This potentially saves processing resources and processing time of the at least one server. As an example, when the pixel represents a well-defined surface (i.e., a smooth or a plain surface), a marching range between the lower bound and the upper bound may be too short, and a marching step size can be large. When the pixel represents a surface with high uncertainty (i.e., a rough surface), the marching range may be longer, and the marching step size can be small.

Furthermore, optionally, the method further comprises:
  utilising an opacity function of the at least one neural network, after training, to determine densities of a plurality of sample points lying on a path of a given ray;
  identifying a sample point having a highest opacity from amongst the plurality of sample points;
  determining an optical depth of a pixel corresponding to the given ray as a distance of the identified sample point from a 3D position of a given viewpoint; and
  updating a corresponding depth tile with the determined optical depth of the pixel.

In this regard, the opacity function (described earlier) can be easily utilised for determining the densities of the plurality of sample points. Densities of the plurality of sample points can be compared with each other for identifying the sample point having the highest opacity. Instead of determining the optical depth of the pixel from the depth information in the depth tiles, the distance of the identified sample point from the 3D position of the given viewpoint is determined as the optical depth of the pixel. Thus, the corresponding depth tile is updated (namely, augmented) with the determined optical depth of the pixel, which is more accurate than the depth information originally captured in a given depth tile. This is done because the depth information in the depth tiles could be inaccurate or obsolete, for example, due to errors in depth estimation by the depth sensor, some change in the given real-world environment, or similar. Therefore, the optical depth of the pixel determined in the aforesaid manner using the at least one (trained) neural network is highly accurate and up-to-date.

In an embodiment, the method further comprises, for each new colour image and a corresponding new depth image captured from a given viewpoint,
  dividing said new colour image and said new depth image into a plurality of new colour tiles and a plurality of new depth tiles, respectively, wherein the plurality of new depth tiles correspond to respective ones of the plurality of new colour tiles;
  reconstructing a colour image from a perspective of the given viewpoint of said new colour image, using any one of: the at least one 3D data structure, the at least one neural network;
  dividing the reconstructed colour image into a plurality of reconstructed colour tiles;
  determining differences between the plurality of new colour tiles and respective ones of the plurality of reconstructed colour tiles; and
  for at least one new colour tile whose difference from a respective reconstructed colour tile exceeds a first predefined threshold difference,
    mapping the at least one new colour tile to at least one voxel in the at least one 3D grid whose colour information is captured in the at least one new colour tile, based on depth information captured in a corresponding new depth tile of said new depth image and the given viewpoint; and
    storing, in a given node of the at least one 3D data structure that represents the at least one voxel, given viewpoint information indicative of the given viewpoint from which said new colour image and said new depth image are captured, along with any of:
      (i) the at least one new colour tile of said new colour image that captures the colour information of the at least one voxel and the corresponding new depth tile of said new depth image that captures the depth information of the at least one voxel,
      (ii) reference information indicative of unique identification of the at least one new colour tile and the corresponding new depth tile.

In this regard, the (reconstructed) colour image is a visual representation of the given real-world environment from the perspective of the given viewpoint of the new colour image, said visual representation being generated using any one of: the at least one 3D data structure, the at least one neural network. Division of the new colour image, the new depth image, and the reconstructed colour image is performed in a same manner as described earlier. The new colour image, the new depth image, and information pertaining to the given viewpoint are received by the at least one server from the device comprising the at least one camera, or from the at least one data repository in real time or near-real time.

It will be appreciated that when the difference between the at least one new colour tile and the respective reconstructed colour tile exceeds the first predefined threshold difference, it can be understood that colour information represented in the at least one new colour tile and colour information represented in the reconstructed colour tile are significantly different from each other. Therefore, any of: the at least one new colour tile capturing the (different) colour information, or reference information pertaining to the at least one new colour tile is required to be stored in the given node of the at least one 3D data structure as latest colour information is available from the perspective of the given viewpoint. Beneficially, this facilitates in saving a storage space at the at least one data repository as only those new colour tiles (and their corresponding new depth tiles) whose colour information is considerably distinct from colour information of existing reconstructed colour tiles are mapped and stored in the at least one 3D data structure. Moreover, this also enables in accurate and realistic image reconstruction using the at least one 3D data structure or the at least one neural network as up-to-date information of the given real-world environment is now available from the at least one 3D data structure.

Optionally, when determining the difference between the at least one new colour tile and the respective reconstructed colour tile, the at least one server is configured to employ a difference metric. In this regard, greater the value of the difference metric, greater is the difference between the at least one new colour tile and the respective reconstructed colour tile (in other words, lower the value of a similarity metric, lower is the similarity between the at least one new colour tile and the respective reconstructed colour tile). Thus, those new colour tiles whose colour information is considerably different from colour information of existing reconstructed colour tiles would contribute new colour information to the at least one 3D data structure, and thus the at least one server prioritizes such new colour tiles when allocating memory. For at least one new colour tile whose difference from a respective reconstructed colour tile does not exceed the first predefined threshold difference, such a new colour tile and its corresponding depth tile are discarded, and they or their reference information is not stored into the given node. Optionally, in this regard, a fixed-size cache of tiles is maintained, wherein the difference metric or the similarity metric is employed to manage allocation and flushing (namely, deletion) of tiles in the cache. This allows to get rid of tiles that are no longer useful and have become obsolete, whilst maintaining only a limited number of useful tiles.

Optionally, the difference metric is based on at least one of: a Mean-Squared Error (MSE) value, a Peak Signal-to-Noise Ratio (PSNR) value, a Structural Similarity Index Measure (SSIM) value. In an example, when the difference metric is based on the SSIM value, the difference between the at least one new colour tile and the respective reconstructed colour tile is considered to exceed the first predefined threshold difference when the SSIM value is lower than a predefined threshold value.

It will be appreciated that the reconstructed colour image can be generated from the at least one 3D data structure or the at least one neural network. When the at least one neural network is trained properly, volume rendering (performed for generating the reconstructed colour image) using the at least one neural network may give better results. Moreover, storing the latest colour information that is available from the perspective of the given viewpoint facilitates in training the at least one neural network with a curated, more refined and meaningful training dataset.

In an alternative or additional embodiment, the method further comprises, for each new colour image and a corresponding new depth image captured from a given viewpoint,
dividing said new colour image and said new depth image into a plurality of new colour tiles and a plurality of new depth tiles, respectively, wherein the plurality of new depth tiles correspond to respective ones of the plurality of new colour tiles;
reconstructing a depth image from a perspective of the given viewpoint of said new depth image, using the at least one 3D data structure;
dividing the reconstructed depth image into a plurality of reconstructed depth tiles;
determining, for each of the plurality of new colour tiles, a difference between a corresponding new depth tile of said new depth image and a corresponding reconstructed depth tile of the reconstructed depth image; and
for at least one new colour tile whose difference between a corresponding new depth tile of said new depth image and a corresponding reconstructed depth tile of the reconstructed depth image exceeds a second predefined threshold difference,
mapping the at least one new colour tile to at least one voxel in the at least one 3D grid whose colour information is captured in the at least one new colour tile, based on depth information captured in the corresponding new depth tile of said new depth image and the given viewpoint; and
storing, in a given node of the at least one 3D data structure that represents the at least one voxel, given viewpoint information indicative of the given viewpoint from which said new colour image and said new depth image are captured, along with any of:
(i) the at least one new colour tile of said new colour image that captures the colour information of the at least one voxel and the corresponding new depth tile of said new depth image that captures the depth information of the at least one voxel,
(ii) reference information indicative of unique identification of the at least one new colour tile and the corresponding new depth tile.

In this regard, the (reconstructed) depth image represents depth information (for example, such as optical depths) pertaining to objects or their parts present in the given real-world environment from the perspective of the given viewpoint of the new depth image, said optical depths being determined from the at least one 3D data structure. It will be appreciated that the (reconstructed) depth image could also be generated using the at least one (trained) neural network. Division of the new colour image, the new depth image, and the reconstructed depth image is performed in a same manner as described earlier. As discussed in the previous embodiment, when the difference between the corresponding new depth tile and the corresponding reconstructed depth tile exceeds the second predefined threshold difference, it can be understood that depth information represented in the corresponding new depth tile and depth information represented in the corresponding reconstructed depth tile are significantly different from each other. Therefore, any of: the corresponding new depth tile capturing the (different) depth information, or reference information pertaining to the corresponding new depth tile is required to be stored in the given node of the at least one 3D data structure as latest depth information is available from the perspective of the given viewpoint. Beneficially, this facilitates in saving a storage space at the at least one data repository as only those new depth tiles (and their corresponding new colour tiles) whose depth information is considerably distinct from depth information of existing reconstructed depth tiles are mapped to the at least one voxel and their reference information is subsequently stored in the given node of the at least one 3D data structure. Moreover, this also enables in accurate and realistic image reconstruction using the at least one 3D data structure as up-to-date information of the given real-world environment is available from the at least one 3D data structure.

Optionally, when determining the difference between the corresponding new depth tile and the corresponding reconstructed depth tile, the at least one server is configured to employ a difference metric, as discussed earlier. In this regard, greater the value of the difference metric, greater is the difference between the at least one new depth tile and the respective reconstructed depth tile (in other words, lower the value of a similarity metric, lower is the similarity between the at least one new depth tile and the respective reconstructed depth tile). For at least one new depth tile (and its corresponding colour tile) whose difference between the corresponding new depth tile and the corresponding reconstructed depth tile does not exceed the second predefined threshold difference, such a new depth tile and its corresponding colour tile are discarded, and they or their reference information is not stored into the given node of the at least one 3D data structure.

Furthermore, in an embodiment, the at least one 3D grid of voxels comprises voxels of different sizes, and wherein the at least one neural network comprises a plurality of neural networks corresponding to respective ones of the voxels of different sizes. In this regard, the voxels in the at least one 3D grid are of varying sizes. The technical benefit of employing the voxels of the different sizes is that it facilitates in dividing the 3D space into the at least one 3D grid of voxels having a spatially-variable resolution. Furthermore, different neural networks correspond to the different sizes of the voxels in the at least one 3D grid. In an example, a first neural network corresponding to a smaller-sized voxel would be different from a second neural network corresponding to a relatively bigger-sized voxel. In such a case, trainings of the first neural network and the second neural network are performed differently in a manner that a portion of the at least one 3D data structure representing the smaller-sized voxel is utilised for training the first neural network, while another portion of the at least one 3D data structure representing the relatively bigger-sized voxel is utilised for training the second neural network.

The technical benefit of employing and training the different neural networks is that it facilitate in generating images with different resolutions. This could be because during the training of the at least one neural network, marching of the given ray through the at least one 3D data structure becomes dependent on a resolution of the pixel corresponding to the given ray. In other words, the (projected) resolution of the pixel being rendered by the at least one neural network is highly likely same as a resolution corresponding to the at least one neural network traversed in each spatial location of a 3D region (in the 3D space) corresponding to the pixel. Moreover, this also enables in providing space-efficient storage of high-resolution details of features.

Optionally, a length of a side of the given voxel lies in a range of 0.1 centimetre (i.e., 1 millimetre) to 50 metres. More optionally, a length of a side of the given voxel lies in a range of 1 centimetre to 10 metres. Yet more optionally, a length of a side of the given voxel lies in a range of 10 centimetres to 2 metres. In an example, in a given 3D grid, some voxels may have each side measuring 5 millimetres, some other voxels may have each side measuring 20 centimetres, and remaining voxels may have each side measuring 1 metre. In such an example, a neural network N1 may correspond to a voxel having each side equal to 5 millimetres, a neural network N2 may correspond to another voxel having each side equal to 20 centimetres, and a neural network N3 may correspond to yet another voxel having each side equal to 1 metre.

Optionally, a size of a given voxel is a function of a distance of the given voxel from at least one viewpoint from which at least one of the plurality of colour images is captured. In this regard, lesser the distance of the given voxel from the at least one viewpoint, lesser is the size of the given voxel in the at least one 3D grid, and vice versa.

In another embodiment, the at least one 3D grid of voxels comprises voxels of a same size, and wherein the at least one neural network comprises a single neural network corresponding to the voxels of the same size. In this regard, the at least one 3D grid is uniform, and the single neural network would be trained by utilising the at least one 3D data structure representing the voxels of the same size. It will be appreciated that such equi-sized voxels may be employed when the at least one 3D grid of voxels is a regular 3D grid. Moreover, employing the equi-sized voxels in the at least one 3D grid is relatively simple and easier to implement.

In yet another embodiment, the at least one 3D grid of voxels comprises a plurality of 3D grids of voxels having different granularity levels, wherein the at least one 3D data structure comprises a plurality of 3D data structures corresponding to respective ones of the plurality of 3D grids. In this regard, the different granularity levels correspond to different levels of abstraction (namely, different levels of detail) with which viewpoint information pertaining to different colour tiles of the given colour image are stored along with any of: the different colour tiles, or their reference information, in different 3D data structures. It will be appreciated that greater the granularity level of a given 3D grid, smaller are the sizes of voxels of the given 3D grid and finer is the given 3D grid, and vice versa. In an example implementation, a size of a voxel in a given 3D grid having a first granularity level is twice a size of a voxel in another given 3D grid having a second granularity level, the second granularity level being greater (i.e., finer) than the first granularity level. This means a voxel-based resolution (i.e., voxels per unit solid angle) is higher for the second granularity level, and is decreased to half for the first granularity level. The technical benefit of employing the plurality of 3D grids of voxels having different granularity levels is that it facilitates in capturing the visual details of the given real-world environment at different granular levels; this allows for reconstructing images having different resolutions as and when required. In such a case, a number of 3D grids is equal to a number of 3D data structures.

In an example, for a first granularity level (i.e., a coarsest granularity level), each side of a given voxel may be 160 centimetres. For a second granularity level, each side of a given voxel may be 80 centimetres. For a third granularity level, each side of a given voxel may be 40 centimetres. For a fourth granularity level (i.e., a finest granularity level), each side of a given voxel may be 20 centimetres.

Optionally, the method further comprises selecting a granularity level from amongst the different granularity levels, based on a frequency with which colour changes across the given colour tile of the given colour image,
wherein the step of mapping comprises mapping the given colour tile of the given colour image to at least one voxel in a given 3D grid having the selected granularity level, and the step of storing comprises storing the viewpoint information, along with any of: the given colour tile and a corresponding depth tile, or their reference information, in a given node of a given 3D data structure that represents the at least one voxel in the given 3D grid.

Optionally, in this regard, greater the frequency of colour change across the given colour tile of the given colour image, greater is the granularity level selected from amongst the different granularity levels, and vice versa. This is because a higher granularity level accurately and comprehensively represents colour information captured in the given colour tile of the given colour image, as compared to a lower granularity level. Upon selecting a particular granularity level, the given 3D grid having the selected granularity level is utilized for mapping the given colour tile to the at least one voxel in the given 3D grid, and the given 3D data structure (corresponding to the aforesaid 3D grid) is utilized for storing the viewpoint information along with any of: the given colour tile and the corresponding depth tile, or their reference information.

Moreover, optionally, the at least one neural network comprises: a single neural network that is trained using the plurality of 3D data structures at the different granularity levels, or a plurality of neural networks corresponding to respective ones of the plurality of 3D grids (in such a case, a particular neural network can be selected based on a resolution at which an image is to be rendered).

Optionally, the at least one neural network comprises a plurality of neural networks corresponding to non-empty voxels of the plurality of 3D grids, and wherein the method further comprises selecting a given neural network from amongst the plurality of neural networks for rendering a given image from a perspective of a given viewpoint, based on:
a resolution at which the given image is to be rendered, and
a distance of a given point in the given real-world environment that is to be represented by a corresponding pixel of the given image from a 3D position of the given viewpoint.

In this regard, different neural networks correspond to different resolution levels. Once the resolution of the given image that is to be rendered is known, the given neural network corresponding to a given resolution that mostly closely matches with the resolution of the given image would be selected. Rendering the given image using the given neural network has already been discussed earlier. In an example, the given neural network can represent a constant spatial resolution, for example, such as the given neural network could encode a cube of each side measuring 1 meter at a resolution of 5 centimetres, or a cube of each side measuring 2 meters at a resolution of 10 centimetre. This allows for encoding in a given node the (real-world) resolution that scales to a real-world size of a given voxel corresponding to the given node.

Additionally, the different neural networks can correspond to different distances between the given (real-world) point that is to be represented by the corresponding pixel and the 3D position of the given viewpoint. In other words, when the given (real-world) point is viewed from different viewpoints, there would be different distances of the given (real-world) point from different 3D positions of these different viewpoints. Moreover, an object or its part present at the given (real-world) point would appear different in the given image when viewed from the different viewpoints. In this regard, once the distance between the given point and the 3D position of the given viewpoint is known, the given neural network corresponding to such a distance would be selected. Therefore, it can be understood that upon knowing the aforesaid two parameters (i.e., resolution and distance), the at least one server can directly infer which granularity level from amongst the different granularity levels (of the plurality of 3D grids of voxels) is required to be employed for rendering the given image from the perspective of the given viewpoint at an accurate resolution. This also facilitates in storing the given neural network in its corresponding node, and thus data which the given neural network must sift through in order to render the given image, remain nearly same.

The present disclosure also relates to the system and to the computer program product as described above. Various embodiments and variants disclosed above, with respect to the aforementioned method, apply mutatis mutandis to the system and to the computer program product.

Optionally, when utilising the at least one 3D data structure, the at least one server is configured to:
process depth information in depth tiles whose reference information is stored in the plurality of nodes of the at least one 3D data structure, based on respective viewpoints from which corresponding depth images are captured, to generate a 3D depth model of the given real-world environment;
determine, from the 3D depth model, an optical depth of a pixel corresponding to a given ray from a 3D position of a given viewpoint, based on a direction of the given ray;
select a lower bound and an upper bound for the given ray, based on the determined optical depth of the pixel; and
during training of the at least one neural network:
march the given ray within the lower bound and the upper bound, or
force an opacity function of the at least one neural network to return a zero value for any sample point on the given ray before the lower bound.

Optionally, when utilising the at least one 3D data structure, the at least one server is configured to determine, from the 3D depth model, optical depths of neighbouring pixels corresponding to neighbouring rays of the given ray from the 3D position of the given viewpoint, based on directions of the neighbouring rays, wherein the lower bound and the upper bound for the given ray are selected, further based on the determined optical depths of the neighbouring pixels.

Optionally, the at least one server is configured to select the lower bound and the upper bound for the given ray, further based on error margins in the depth information.

Optionally, when utilising the at least one 3D data structure, the at least one server is configured to factor the upper bound into a loss function employed in the at least one neural network.

Optionally, when marching, the at least one server is configured to:
determine a set of non-empty nodes of the at least one 3D data structure whose corresponding voxels lie on a path of the given ray within the lower bound and the upper bound;

determine, for each colour tile whose reference information is stored in a given non-empty node of the set, a respective direction pointing from a 3D position of a respective viewpoint towards a corresponding voxel of the given non-empty node;

select, from amongst colour tiles and depth tiles whose respective reference information is stored in the given non-empty node of the set, at least one colour tile and at least one corresponding depth tile whose determined direction matches the given ray most closely; and march the given ray within the lower bound and the upper bound during training of the at least one neural network, by utilising the at least one colour tile and the at least one corresponding depth tile selected for the given non-empty node.

Optionally, when utilising the at least one 3D data structure, the at least one server is configured to:

determine a set of non-empty nodes of the at least one 3D data structure whose corresponding voxels lie on a path of a given ray;

determine, for each colour tile whose reference information is stored in a given non-empty node of the set, a respective direction pointing from a 3D position of a respective viewpoint towards a corresponding voxel of the given non-empty node;

select, from amongst colour tiles and depth tiles whose respective reference information is stored in the given non-empty node of the set, at least one colour tile and at least one corresponding depth tile whose determined direction matches the given ray most closely; and train the at least one neural network using the at least one selected colour tile and the at least one corresponding depth tile.

Optionally, when utilising the at least one 3D data structure, the at least one server is configured to:

determine a set of non-empty nodes of the at least one 3D data structure whose corresponding voxels lie on a path of a given ray;

identify a first non-empty node in said set at which the given ray enters;

determine, for each colour tile whose reference information is stored in the first non-empty node, a respective direction pointing from a 3D position of a respective viewpoint towards a corresponding voxel of the first non-empty node;

select, from amongst colour tiles and depth tiles whose respective reference information is stored in the first non-empty node, at least one colour tile and at least one corresponding depth tile whose determined direction matches the given ray most closely;

determine, from the at least one selected colour tile and the at least one corresponding depth tile, a colour, an opacity and an optical depth of a pixel corresponding to the given ray, based on a direction of the given ray; and train the at least one neural network using the determined colour, the determined opacity and the determined optical depth of the pixel corresponding to the given ray.

Optionally, the at least one server is configured to utilise the at least one 3D data structure to render images with the at least one neural network.

Optionally, when utilising the at least one 3D data structure, the at least one server is configured to:

process depth information in depth tiles whose reference information is stored in the plurality of nodes of the at least one 3D data structure, based on respective viewpoints from which corresponding depth images are captured, to generate a 3D depth model of the given real-world environment;

determine, from the 3D depth model, an optical depth of a pixel corresponding to a given ray from a 3D position of a given viewpoint, based on a direction of the given ray;

select a lower bound and an upper bound for the given ray, based on the determined optical depth of the pixel; and march the given ray within the lower bound and the upper bound to render a given image with the at least one neural network.

Optionally, the at least one server is configured to:

utilise an opacity function of the at least one neural network, after training, to determine densities of a plurality of sample points lying on a path of a given ray;

identify a sample point having a highest opacity from amongst the plurality of sample points;

determine an optical depth of a pixel corresponding to the given ray as a distance of the identified sample point from a 3D position of a given viewpoint; and update a corresponding depth tile with the determined optical depth of the pixel.

Optionally, for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a colour image from a perspective of the given viewpoint of said new colour image, using any one of: the at least one 3D data structure, the at least one neural network;

divide the reconstructed colour image into a plurality of reconstructed colour tiles;

determine differences between the plurality of new colour tiles and respective ones of the plurality of reconstructed colour tiles; and for at least one new colour tile whose difference from a respective reconstructed colour tile exceeds a first predefined threshold difference, map the at least one new colour tile to at least one voxel in the at least one 3D grid whose colour information is captured in the at least one new colour tile, based on depth information captured in a corresponding new depth tile of said new depth image and the given viewpoint; and store, in a given node of the at least one 3D data structure that represents the at least one voxel, given viewpoint information indicative of the given viewpoint from which said new colour image and said new depth image are captured, along with any of:

(i) the at least one new colour tile of said new colour image that captures the colour information of the at least one voxel and the corresponding new depth tile of said new depth image that captures the depth information of the at least one voxel, (ii) reference information indicative of unique identification of the at least one new colour tile and the corresponding new depth tile.

Optionally, for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a depth image from a perspective of the given viewpoint of said new depth image, using the at least one 3D data structure;

divide the reconstructed depth image into a plurality of reconstructed depth tiles;

determine, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference, map the at least one new colour tile to at least one voxel in the at least one 3D grid whose colour information is captured in the at least one new colour tile, based on depth information captured in the corresponding new depth tile of said new depth image and the given viewpoint; and store, in a given node of the at least one 3D data structure that represents the at least one voxel, given viewpoint information indicative of the given viewpoint from which said new colour image and said new depth image are captured, along with any of:

(i) the at least one new colour tile of said new colour image that captures the colour information of the at least one voxel and the corresponding new depth tile of said new depth image that captures the depth information of the at least one voxel, (ii) reference information indicative of unique identification of the at least one new colour tile and the corresponding new depth tile.

Optionally, the at least one 3D grid of voxels comprises voxels of different sizes, and wherein the at least one neural network comprises a plurality of neural networks corresponding to respective ones of the voxels of different sizes.

Alternatively, optionally, the at least one 3D grid of voxels comprises a plurality of 3D grids of voxels having different granularity levels, wherein the at least one 3D data structure comprises a plurality of 3D data structures corresponding to respective ones of the plurality of 3D grids.

Optionally, the at least one neural network comprises a plurality of neural networks corresponding to non-empty voxels of the plurality of 3D grids, and wherein the at least one server is configured to select a given neural network from amongst the plurality of neural networks for rendering a given image from a perspective of a given viewpoint, based on:

a resolution at which the given image is to be rendered, and a distance of a given point in the given real-world environment that is to be represented by a corresponding pixel of the given image from a 3D position of the given viewpoint.

Optionally, a given node of the at least one 3D data structure is an oriented bounding box (OBB).

DETAILED DESCRIPTION OF THE DRAWINGS

Referring to FIG. 1, illustrated is a block diagram of an architecture of a system 100 incorporating multiresolution truncated neural radiance fields or similar neural networks, in accordance with an embodiment of the present disclosure. The system 100 comprises at least one server (depicted as a server 102). Optionally, the system 100 further comprises at least one data repository (depicted as a data repository 104) that is communicably coupled to the server 102.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2A:
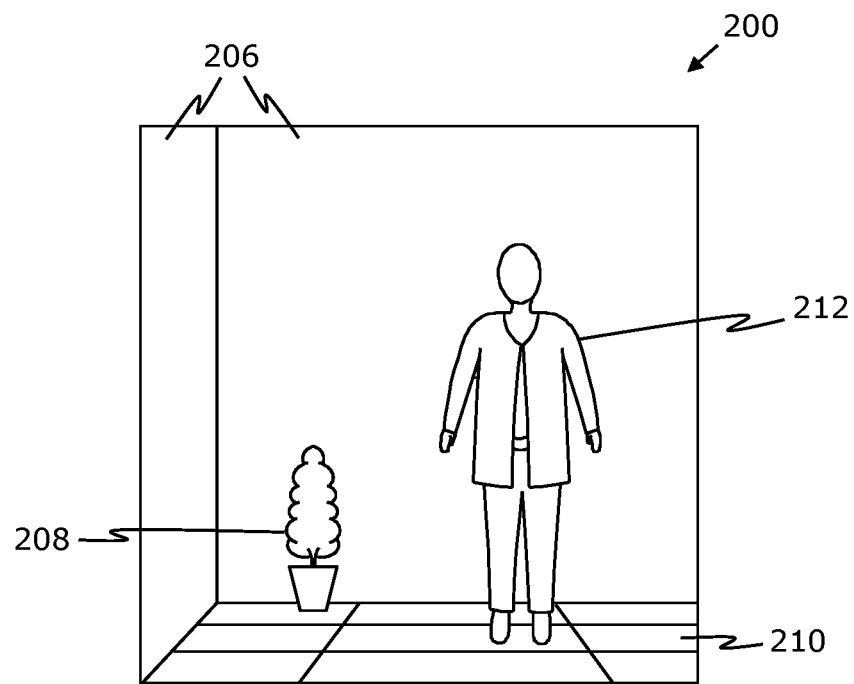
FIG. 2A illustrates an exemplary colour image of a real-world environment.
Figure 2B:
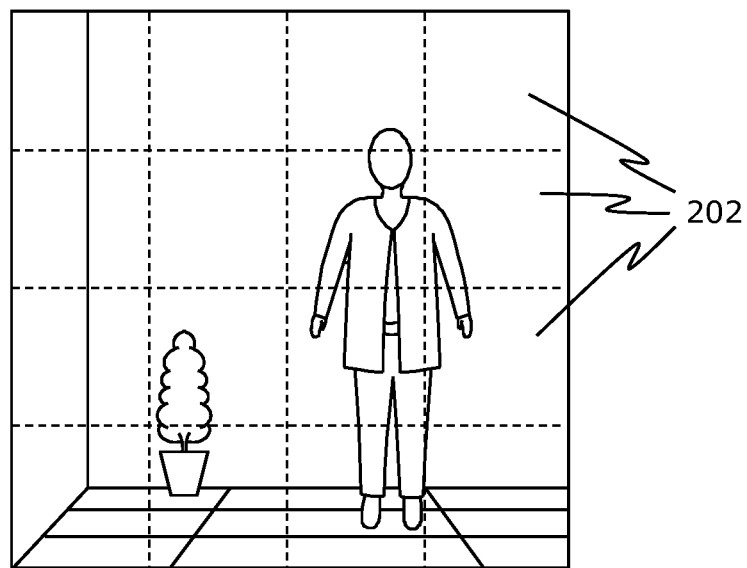
Figure 2C:
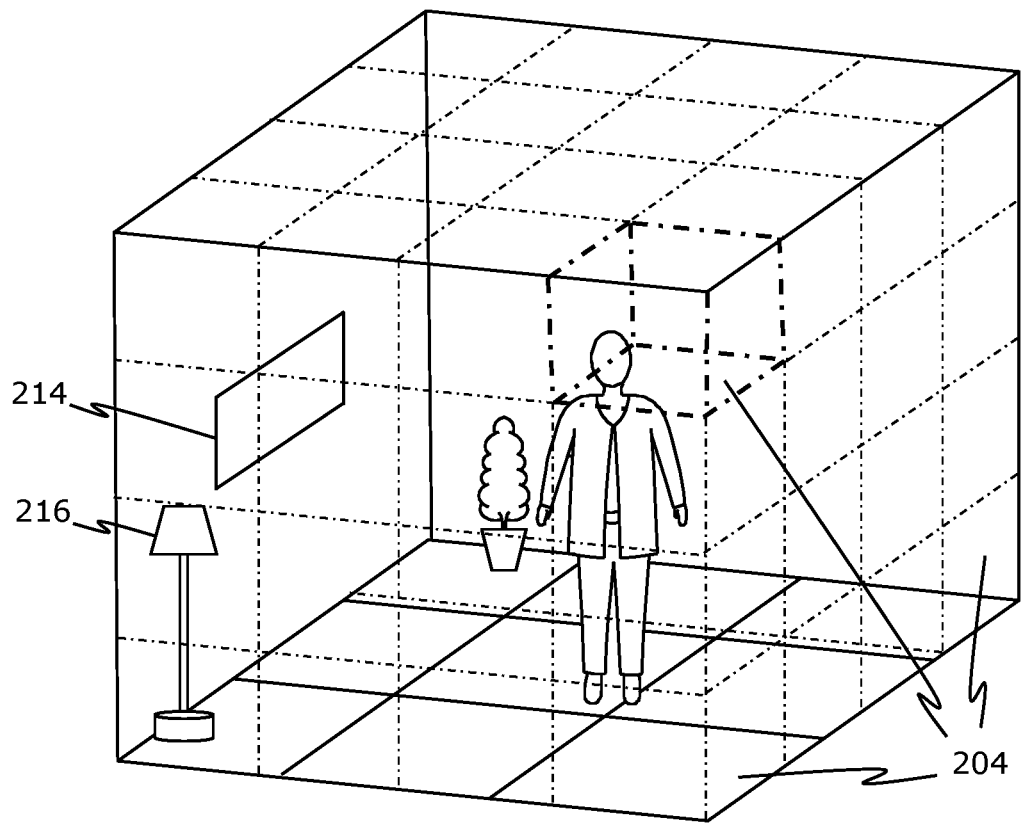
FIG. 2C illustrates a three-dimensional (3D) space occupied by the real-world environment being divided into a 3D grid of voxels, in accordance with an embodiment of the present disclosure.

Referring to FIGS. 2A, 2B, and 2C, FIG. 2A is a schematic representation of an exemplary colour image 200 of a real-world environment, FIG. 2B is a schematic representation of how the colour image 200 can be divided into a plurality of colour tiles 202, while FIG. 2C is a schematic representation of a three-dimensional (3D) space occupied by the real-world environment being divided into a 3D grid of voxels 204, in accordance with an embodiment of the present disclosure.

With reference to FIG. 2A, the colour image 200 is captured using a camera (not shown) from a particular pose of the camera. The colour image 200 represents a living room in the real-world environment, the living room having a plurality of objects 206, 208, 210, 212, 214 and 216, depicted as walls, an indoor plant, a tiled floor, a human, a television and a lamp, respectively.

With reference to FIG. 2B, the colour image 200 is shown to be divided into 16 equi-sized colour tiles (depicted as a 4×4 grid of dashed lines), for sake of simplicity. Similarly, a depth image (not shown) corresponding to the colour image 200 is divided into a plurality of depth tiles, wherein the plurality of depth tiles correspond to respective ones of the plurality of colour tiles 202.

With reference to FIG. 2C, the 3D space represents the living room in the real-world environment. The 3D space is shown to be divided into the 3D grid of 64 equi-sized voxels (depicted as a 4×4×4 3D grid of dash-dot lines). For sake of simplicity, the 3D space is divided into only 64 voxels, and one of the 64 voxels that is located at an upper right corner of the 3D space is shown in a complete 3D form.

FIGS. 2A-2C are merely examples, which should not unduly limit the scope of the claims herein. A person skilled in the art will recognize many variations, alternatives, and modifications of embodiments of the present disclosure.

Figure 3A:
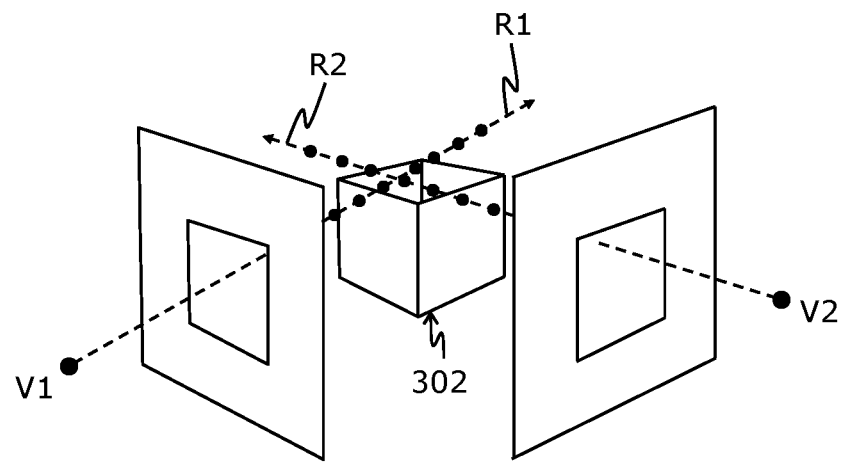
FIGS. 3A and 3B illustrate how marching of a ray is performed during training of a neural network, in accordance with an embodiment of the present disclosure.
Figure 3B:
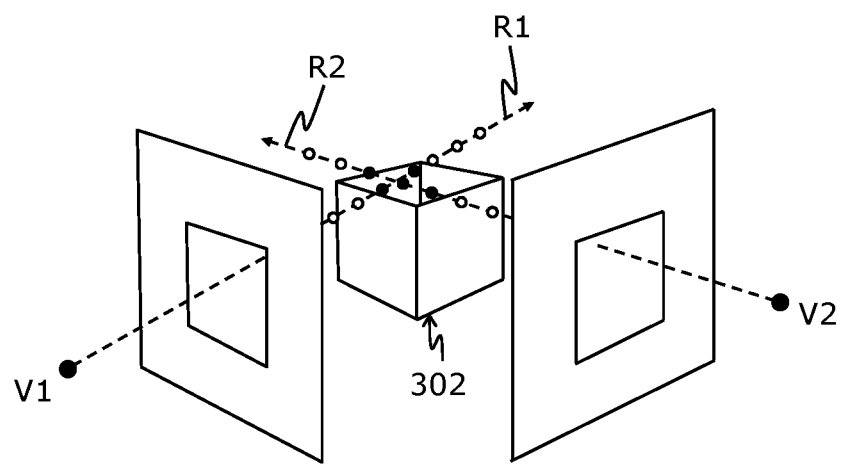

Referring to FIGS. 3A and 3B, illustrated is how marching of a ray is performed during training of a neural network, in accordance with an embodiment of the present disclosure. With reference to FIGS. 3A and 3B, an object 302 present in a real-world environment is being imaged from two different viewpoints V1 and V2 in the real-world environment. Different sample points (for example, depicted as solid black colour dots) are shown to lie on rays R1 and R2 originating from 3D positions of the two different viewpoints V1 and V2, respectively. The different sample points correspond to different 3D positions in the real-world environment.

Referring to FIG. 3B, as shown, some sample points from amongst the different sample points (for example, sample points depicted using solid black colour dots) fall on a surface of the object 302, while other sample points from amongst the different sample points (for example, sample points depicted using hollow dots) fall outside any surface of the object. The rays R1 and R2 are marched for the different sample points in order to train the neural network. Upon training, colours and opacities of some sample points (namely, colours and opacities of real-world points corresponding to the different 3D positions) can be determined using the (trained) neural network. Other sample points do not have any colours and opacities. As an example, such sample points represent empty spaces (around the object 302) in the real-world environment.

Figures 4A, 4B:
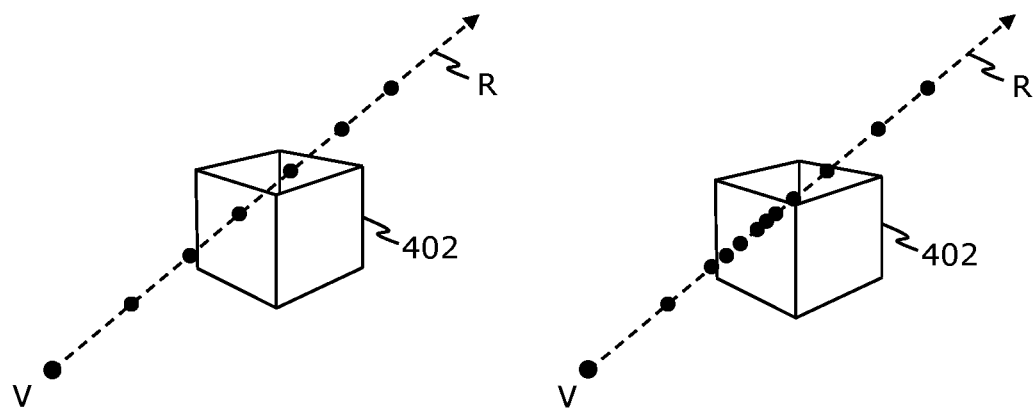
FIGS. 4A and 4B illustrate different exemplary ways of sampling of a ray, in accordance with an embodiment of the present disclosure.

Referring to FIGS. 4A and 4B, illustrated are different exemplary ways of sampling of a ray R, in accordance with an embodiment of the present disclosure. With reference to FIGS. 4A and 4B, an object 402 present in a real-world environment is being imaged from a viewpoint V in the real-world environment. Different sample points (for example, depicted as solid black colour dots) are shown to lie on the ray R originating from a 3D position of the viewpoint V.

Referring to FIG. 4A, the different sample points are chosen in a manner that said sample points are equi-distant from each other for an entirety of the ray R. For example, only 2 sample points out of a total of 6 equi-distant sample points fall on the object 402. Referring to FIG. 4B, the different sample points are chosen based on hierarchical sampling, wherein said sample points are not necessarily equi-distant from each other. Higher number of sample points are chosen for a part of the ray R having a higher density, as compared to a remaining part of the ray R having a relatively lower density. In other words, the part of the ray R that falls on a surface of the object 402 is shown to have greater number of sample points, as compared to the remaining part of the ray R.

Figures 5A, 5B, 5C:
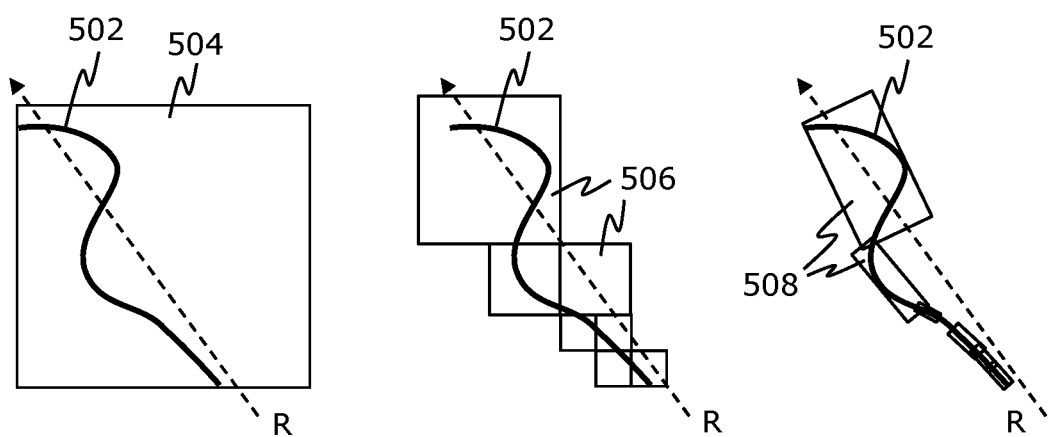
FIGS. 5A, 5B, and 5C illustrate various exemplary scenarios of ray marching, in accordance with an embodiment of the present disclosure.

Referring to FIGS. 5A, 5B, and 5C, illustrated are various exemplary scenarios of ray marching, in accordance with an embodiment of the present disclosure. With reference to FIGS. 5A-5C, a ray R is shown to be marching a feature 502 of an object (not shown) present in a real-world environment. With reference to FIG. 5A, an entirety of the feature 502 is represented using a single voxel 504 in a three-dimensional (3D) space of the real-world environment. The single voxel has a fixed granularity level. With reference to FIG. 5B, different parts of the feature 502 are represented using different voxels 506 having different granularity levels. With reference to FIG. 5C, different parts of the feature 502 are represented using different voxels 508 having different granularity levels, wherein the different voxels 508 correspond to different nodes implemented as oriented bounding boxes (OBBs). For sake of simplicity, a given voxel in the 3D space is represented in a two-dimensional (2D) form.

FIGS. 3A-3B, 4A-4B, and 5A-5C are merely examples, which should not unduly limit the scope of the claims herein. A person skilled in the art will recognize many variations, alternatives, and modifications of embodiments of the present disclosure.

Figure 6:
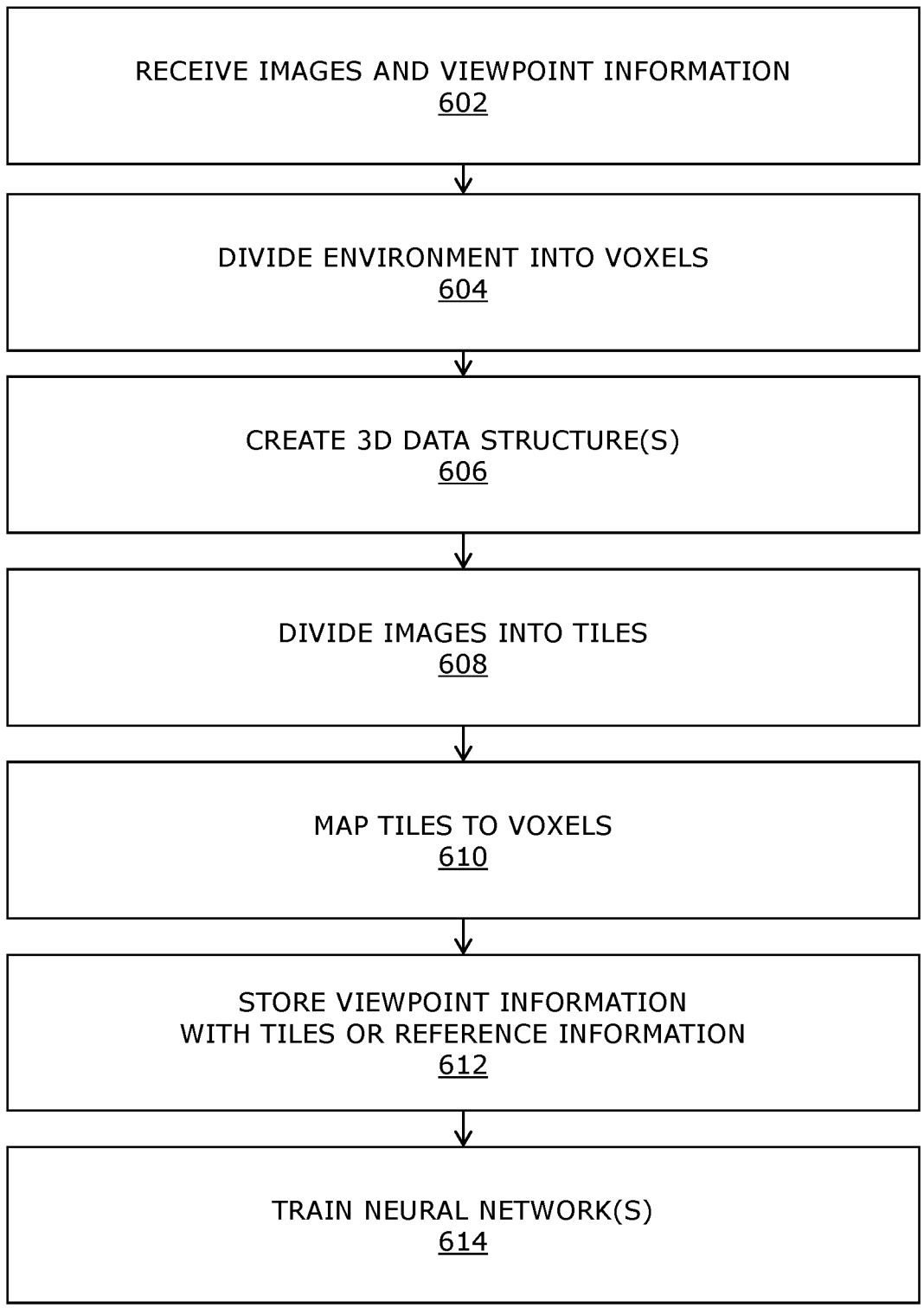
FIG. 6 illustrates steps of a computer-implemented method incorporating multiresolution truncated neural radiance fields, in accordance with an embodiment of the present disclosure.

Referring to FIG. 6, illustrated are steps of a computer-implemented method incorporating multiresolution truncated neural radiance fields or similar neural networks, in accordance with an embodiment of the present disclosure. At step 602, there are received a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system. At step 604, a 3D space occupied by the given real-world environment is divided into at least one 3D grid of voxels, wherein the at least one 3D grid is represented in the given coordinate system. At step 606, at least one 3D data structure comprising a plurality of nodes is created, each node representing a corresponding voxel of the 3D space occupied by the given real-world environment. At step 608, a given colour image and a given depth image corresponding to the given colour image are divided into a plurality of colour tiles and a plurality of depth tiles, respectively, wherein the plurality of depth tiles correspond to respective ones of the plurality of colour tiles. At step 610, a given colour tile of the given colour image is mapped to at least one voxel in the at least one 3D grid whose colour information is captured in the given colour tile, based on depth information captured in a corresponding depth tile of the given depth image and a given viewpoint from which the given colour image and the given depth image are captured. At step 612, given viewpoint information (indicative of the given viewpoint from which the given colour image and the given depth image are captured) is stored in a given node of the at least one 3D data structure representing the at least one voxel, along with any of: (i) the given colour tile of the given colour image that captures the colour information of the at least one voxel and the corresponding depth tile of the given depth image that captures the depth information, (ii) reference information indicative of unique identification of the given colour tile and the corresponding depth tile. At step 614, the at least one 3D data structure is utilised for training at least one neural network, wherein a given input of the at least one neural network comprises information indicative of a 3D position of a given point in the given real-world environment and a given output of the at least one neural network comprises a colour and an opacity of the given point.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method comprising:
receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
dividing a 3D space occupied by the given real-world environment into at least one 3D grid of voxels, wherein the at least one 3D grid is represented in the given coordinate system;
creating at least one 3D data structure comprising a plurality of nodes, each node representing a corresponding voxel of the 3D space occupied by the given real-world environment;

dividing a given colour image and a given depth image corresponding to the given colour image into a plurality of colour tiles and a plurality of depth tiles, respectively, wherein the plurality of depth tiles correspond to respective ones of the plurality of colour tiles;

mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;

storing, in a given node of the at least one 3D data structure representing the at least one voxel, given viewpoint information indicative of the given viewpoint from which the given colour image and the given depth image are captured, along with any of:

(i) the given colour tile of the given colour image that captures the colour information of the at least one voxel and the corresponding depth tile of the given depth image that captures the depth information of the at least one voxel, (ii) reference information indicative of unique identification of the given colour tile and the corresponding depth tile; and utilising the at least one 3D data structure for training at least one neural network, wherein a given input of the at least one neural network comprises information indicative of a 3D position of a given point in the given real-world environment and a given output of the at least one neural network comprises a colour and an opacity of the given point.

2. The computer-implemented method of claim 1, wherein the step of utilising the at least one 3D data structure comprises:

processing depth information in depth tiles whose reference information is stored in the plurality of nodes of the at least one 3D data structure, based on respective viewpoints from which corresponding depth images are captured, to generate a 3D depth model of the given real-world environment;

determining, from the 3D depth model, an optical depth of a pixel corresponding to a given ray from a 3D position of a given viewpoint, based on a direction of the given ray;

selecting a lower bound and an upper bound for the given ray, based on the determined optical depth of the pixel; and during training of the at least one neural network:
marching the given ray within the lower bound and the upper bound, or
forcing an opacity function of the at least one neural network to return a zero value for any sample point on the given ray before the lower bound.

3. The computer-implemented method of claim 2, wherein the step of utilising the at least one 3D data structure further comprises determining, from the 3D depth model, optical depths of neighbouring pixels corresponding to neighbouring rays of the given ray from the 3D position of the given viewpoint, based on directions of the neighbouring rays, wherein the lower bound and the upper bound for the given ray are selected, further based on the determined optical depths of the neighbouring pixels.

4. The computer-implemented method of claim 2, wherein the lower bound and the upper bound for the given ray are selected, further based on error margins in the depth information.

5. The computer-implemented method of claim 2, wherein the step of utilising the at least one 3D data structure further comprises factoring the upper bound into a loss function employed in the at least one neural network.

6. The computer-implemented method of claim 2, wherein the step of marching comprises:

determining a set of non-empty nodes of the at least one 3D data structure whose corresponding voxels lie on a path of the given ray within the lower bound and the upper bound;

determining, for each colour tile whose reference information is stored in a given non-empty node of the set, a respective direction pointing from a 3D position of a respective viewpoint towards a corresponding voxel of the given non-empty node;

selecting, from amongst colour tiles and depth tiles whose respective reference information is stored in the given non-empty node of the set, at least one colour tile and at least one corresponding depth tile whose determined direction matches the given ray most closely; and marching the given ray within the lower bound and the upper bound during training of the at least one neural network, by utilising the at least one colour tile and the at least one corresponding depth tile selected for the given non-empty node.

7. The computer-implemented method of claim 1, wherein the step of utilising the at least one 3D data structure comprises:

determining a set of non-empty nodes of the at least one 3D data structure whose corresponding voxels lie on a path of a given ray;

determining, for each colour tile whose reference information is stored in a given non-empty node of the set, a respective direction pointing from a 3D position of a respective viewpoint towards a corresponding voxel of the given non-empty node;

selecting, from amongst colour tiles (202) and depth tiles whose respective reference information is stored in the given non-empty node of the set, at least one colour tile and at least one corresponding depth tile whose determined direction matches the given ray most closely; and training the at least one neural network using the at least one selected colour tile and the at least one corresponding depth tile.

8. The computer-implemented method of claim 1, wherein the step of utilising the at least one 3D data structure comprises:

determining a set of non-empty nodes of the at least one 3D data structure whose corresponding voxels lie on a path of a given ray;

identifying a first non-empty node in said set at which the given ray enters;

determining, for each colour tile whose reference information is stored in the first non-empty node, a respective direction pointing from a 3D position of a respective viewpoint towards a corresponding voxel of the first non-empty node;

selecting, from amongst colour tiles and depth tiles whose respective reference information is stored in the first non-empty node, at least one colour tile and at least one corresponding depth tile whose determined direction matches the given ray most closely;

determining, from the at least one selected colour tile and the at least one corresponding depth tile, a colour, an opacity and an optical depth of a pixel corresponding to the given ray, based on a direction of the given ray; and training the at least one neural network using the determined colour, the determined opacity and the determined optical depth of the pixel corresponding to the given ray.

9. The computer-implemented method of claim 1, further comprising utilising the at least one 3D data structure to render images with the at least one neural network.

10. The computer-implemented method of claim 9, wherein the step of utilising the at least one 3D data structure comprises:

processing depth information in depth tiles whose reference information is stored in the plurality of nodes of the at least one 3D data structure, based on respective viewpoints from which corresponding depth images are captured, to generate a 3D depth model of the given real-world environment;

determining, from the 3D depth model, an optical depth of a pixel corresponding to a given ray from a 3D position of a given viewpoint, based on a direction of the given ray;

selecting a lower bound and an upper bound for the given ray, based on the determined optical depth of the pixel; and marching the given ray within the lower bound and the upper bound to render a given image with the at least one neural network.

11. The computer-implemented method of claim 1, further comprising:

utilising an opacity function of the at least one neural network, after training, to determine densities of a plurality of sample points lying on a path of a given ray;

identifying a sample point having a highest opacity from amongst the plurality of sample points;

determining an optical depth of a pixel corresponding to the given ray as a distance of the identified sample point from a 3D position of a given viewpoint; and updating a corresponding depth tile with the determined optical depth of the pixel.

12. The computer-implemented method of claim 1, further comprising, for each new colour image and a corresponding new depth image captured from a given viewpoint, dividing said new colour image and said new depth image into a plurality of new colour tiles and a plurality of new depth tiles, respectively, wherein the plurality of new depth tiles correspond to respective ones of the plurality of new colour tiles;

reconstructing a colour image from a perspective of the given viewpoint of said new colour image, using any one of: the at least one 3D data structure, the at least one neural network;

dividing the reconstructed colour image into a plurality of reconstructed colour tiles;

determining differences between the plurality of new colour tiles and respective ones of the plurality of reconstructed colour tiles; and for at least one new colour tile whose difference from a respective reconstructed colour tile exceeds a first predefined threshold difference, mapping the at least one new colour tile to at least one voxel in the at least one 3D grid whose colour information is captured in the at least one new colour tile, based on depth information captured in a corresponding new depth tile of said new depth image and the given viewpoint; and storing, in a given node of the at least one 3D data structure that represents the at least one voxel, given viewpoint information indicative of the given viewpoint from which said new colour image and said new depth image are captured, along with any of:

(i) the at least one new colour tile of said new colour image that captures the colour information of the at least one voxel and the corresponding new depth tile of said new depth image that captures the depth information of the at least one voxel, (ii) reference information indicative of unique identification of the at least one new colour tile and the corresponding new depth tile.

13. The computer-implemented method of claim 1, further comprising, for each new colour image and a corresponding new depth image captured from a given viewpoint, dividing said new colour image and said new depth image into a plurality of new colour tiles and a plurality of new depth tiles, respectively, wherein the plurality of new depth tiles correspond to respective ones of the plurality of new colour tiles;

reconstructing a depth image from a perspective of the given viewpoint of said new depth image, using the at least one 3D data structure;

dividing the reconstructed depth image into a plurality of reconstructed depth tiles;

determining, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference, mapping the at least one new colour tile to at least one voxel in the at least one 3D grid whose colour information is captured in the at least one new colour tile, based on depth information captured in the corresponding new depth tile of said new depth image and the given viewpoint; and storing, in a given node of the at least one 3D data structure that represents the at least one voxel, given viewpoint information indicative of the given viewpoint from which said new colour image and said new depth image are captured, along with any of:

(i) the at least one new colour tile of said new colour image that captures the colour information of the at least one voxel and the corresponding new depth tile of said new depth image that captures the depth information of the at least one voxel, (ii) reference information indicative of unique identification of the at least one new colour tile and the corresponding new depth tile.

14. The computer-implemented method of claim 1, wherein the at least one 3D grid of voxels comprises voxels of different sizes, and wherein the at least one neural network comprises a plurality of neural networks corresponding to respective ones of the voxels of different sizes.

15. The computer-implemented method of claim 1, wherein the at least one 3D grid of voxels comprises a plurality of 3D grids of voxels having different granularity levels, wherein the at least one 3D data structure comprises a plurality of 3D data structures corresponding to respective ones of the plurality of 3D grids.

16. The computer-implemented method of claim 15, wherein the at least one neural network comprises a plurality of neural networks corresponding to non-empty voxels of the plurality of 3D grids, and wherein the method further comprises selecting a given neural network from amongst the plurality of neural networks for rendering a given image from a perspective of a given viewpoint, based on:
- a resolution at which the given image is to be rendered, and
- a distance of a given point in the given real-world environment that is to be represented by a corresponding pixel of the given image from a 3D position of the given viewpoint.

17. The computer-implemented method of claim 1, wherein a given node of the at least one 3D data structure is an oriented bounding box (OBB).

18. A system comprising at least one server, wherein the at least one server is configured to:
- receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
- divide a 3D space occupied by the given real-world environment into at least one 3D grid of voxels, wherein the at least one 3D grid is represented in the given coordinate system;
- create at least one 3D data structure comprising a plurality of nodes, each node representing a corresponding voxel of the 3D space occupied by the given real-world environment;
- divide a given colour image and a given depth image corresponding to the given colour image into a plurality of colour tiles and a plurality of depth tiles, respectively, wherein the plurality of depth tiles correspond to respective ones of the plurality of colour tiles;
- map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured;
- store, in a given node of the at least one 3D data structure representing the at least one voxel, given viewpoint information indicative of the given viewpoint from which the given colour image and the given depth image are captured, along with any of:
  (i) the given colour tile of the given colour image that captures the colour information of the at least one voxel and the corresponding depth tile of the given depth image that captures the depth information of the at least one voxel,
  (ii) reference information indicative of unique identification of the given colour tile and the corresponding depth tile; and
- utilise the at least one 3D data structure for training at least one neural network, wherein a given input of the at least one neural network comprises information indicative of a 3D position of a given point in the given real-world environment and a given output of the at least one neural network comprises a colour and an opacity of the given point.

19. The system of claim 18, wherein when utilising the at least one 3D data structure, the at least one server is configured to:
- process depth information in depth tiles whose reference information is stored in the plurality of nodes of the at least one 3D data structure, based on respective viewpoints from which corresponding depth images are captured, to generate a 3D depth model of the given real-world environment;
- determine, from the 3D depth model, an optical depth of a pixel corresponding to a given ray from a 3D position of a given viewpoint, based on a direction of the given ray;
- select a lower bound and an upper bound for the given ray, based on the determined optical depth of the pixel; and
- during training of the at least one neural network:
  march the given ray within the lower bound and the upper bound, or
  force an opacity function of the at least one neural network to return a zero value for any sample point on the given ray before the lower bound.

20. The system of claim 19, wherein when utilising the at least one 3D data structure, the at least one server is configured to determine, from the 3D depth model, optical depths of neighbouring pixels corresponding to neighbouring rays of the given ray from the 3D position of the given viewpoint, based on directions of the neighbouring rays, wherein the lower bound and the upper bound for the given ray are selected, further based on the determined optical depths of the neighbouring pixels.

21. The system of claim 19, wherein the at least one server is configured to select the lower bound and the upper bound for the given ray, further based on error margins in the depth information.

22. The system of claim 19, wherein when utilising the at least one 3D data structure, the at least one server is configured to factor the upper bound into a loss function employed in the at least one neural network.

23. The system of claim 19, wherein when marching, the at least one server is configured to:
- determine a set of non-empty nodes of the at least one 3D data structure whose corresponding voxels lie on a path of the given ray within the lower bound and the upper bound;
- determine, for each colour tile whose reference information is stored in a given non-empty node of the set, a respective direction pointing from a 3D position of a respective viewpoint towards a corresponding voxel of the given non-empty node;
- select, from amongst colour tiles and depth tiles whose respective reference information is stored in the given non-empty node of the set, at least one colour tile and at least one corresponding depth tile whose determined direction matches the given ray most closely; and
- march the given ray within the lower bound and the upper bound during training of the at least one neural network, by utilising the at least one colour tile and the at least one corresponding depth tile selected for the given non-empty node.

24. The system of claim 18, wherein when utilising the at least one 3D data structure, the at least one server is configured to:

determine a set of non-empty nodes of the at least one 3D data structure whose corresponding voxels lie on a path of a given ray;

determine, for each colour tile whose reference information is stored in a given non-empty node of the set, a respective direction pointing from a 3D position of a respective viewpoint towards a corresponding voxel of the given non-empty node;

select, from amongst colour tiles and depth tiles whose respective reference information is stored in the given non-empty node of the set, at least one colour tile and at least one corresponding depth tile whose determined direction matches the given ray most closely; and train the at least one neural network using the at least one selected colour tile and the at least one corresponding depth tile.

25. The system of claim 18, wherein when utilising the at least one 3D data structure, the at least one server is configured to:

determine a set of non-empty nodes of the at least one 3D data structure whose corresponding voxels lie on a path of a given ray;

identify a first non-empty node in said set at which the given ray enters;

determine, for each colour tile whose reference information is stored in the first non-empty node, a respective direction pointing from a 3D position of a respective viewpoint towards a corresponding voxel of the first non-empty node;

select, from amongst colour tiles and depth tiles whose respective reference information is stored in the first non-empty node, at least one colour tile and at least one corresponding depth tile whose determined direction matches the given ray most closely;

determine, from the at least one selected colour tile and the at least one corresponding depth tile, a colour, an opacity and an optical depth of a pixel corresponding to the given ray, based on a direction of the given ray; and train the at least one neural network using the determined colour, the determined opacity and the determined optical depth of the pixel corresponding to the given ray.

26. The system of any of claim 18, wherein the at least one server is configured to utilise the at least one 3D data structure to render images with the at least one neural network.

27. The system of claim 26, wherein when utilising the at least one 3D data structure, the at least one server is configured to:

process depth information in depth tiles whose reference information is stored in the plurality of nodes of the at least one 3D data structure, based on respective viewpoints from which corresponding depth images are captured, to generate a 3D depth model of the given real-world environment;

determine, from the 3D depth model, an optical depth of a pixel corresponding to a given ray from a 3D position of a given viewpoint, based on a direction of the given ray;

select a lower bound and an upper bound for the given ray, based on the determined optical depth of the pixel; and march the given ray within the lower bound and the upper bound to render a given image with the at least one neural network.

28. The system of claim 18, wherein the at least one server is configured to:

utilise an opacity function of the at least one neural network, after training, to determine densities of a plurality of sample points lying on a path of a given ray;

identify a sample point having a highest opacity from amongst the plurality of sample points;

determine an optical depth of a pixel corresponding to the given ray as a distance of the identified sample point from a 3D position of a given viewpoint; and update a corresponding depth tile with the determined optical depth of the pixel.

29. The system of claim 18, wherein for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a colour image from a perspective of the given viewpoint of said new colour image, using any one of: the at least one 3D data structure, the at least one neural network;

divide the reconstructed colour image into a plurality of reconstructed colour tiles;

determine differences between the plurality of new colour tiles and respective ones of the plurality of reconstructed colour tiles; and for at least one new colour tile whose difference from a respective reconstructed colour tile exceeds a first predefined threshold difference, map the at least one new colour tile to at least one voxel in the at least one 3D grid whose colour information is captured in the at least one new colour tile, based on depth information captured in a corresponding new depth tile of said new depth image and the given viewpoint; and store, in a given node of the at least one 3D data structure that represents the at least one voxel, given viewpoint information indicative of the given viewpoint from which said new colour image and said new depth image are captured, along with any of:

(i) the at least one new colour tile of said new colour image that captures the colour information of the at least one new voxel and the corresponding new depth tile of said new depth image that captures the depth information of the at least one voxel, (ii) reference information indicative of unique identification of the at least one new colour tile and the corresponding new depth tile.

30. The system of claim 18, wherein for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a depth image from a perspective of the given viewpoint of said new depth image, using the at least one 3D data structure;

divide the reconstructed depth image into a plurality of reconstructed depth tiles;

determine, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference, map the at least one new colour tile to at least one voxel in the at least one 3D grid whose colour information is captured in the at least one new colour tile, based on depth information captured in the corresponding new depth tile of said new depth image and the given viewpoint; and store, in a given node of the at least one 3D data structure that represents the at least one voxel, given viewpoint information indicative of the given viewpoint from which said new colour image and said new depth image are captured, along with any of:
- (i) the at least one new colour tile of said new colour image that captures the colour information of the at least one voxel and the corresponding new depth tile of said new depth image that captures the depth information of the at least one voxel,
- (ii) reference information indicative of unique identification of the at least one new colour tile and the corresponding new depth tile.

31. The system of claim 18, wherein the at least one 3D grid of voxels comprises voxels of different sizes, and wherein the at least one neural network comprises a plurality of neural networks corresponding to respective ones of the voxels of different sizes.

32. The system of claim 18, wherein the at least one 3D grid of voxels comprises a plurality of 3D grids of voxels having different granularity levels, wherein the at least one 3D data structure comprises a plurality of 3D data structures corresponding to respective ones of the plurality of 3D grids.

33. The system of claim 32, wherein the at least one neural network comprises a plurality of neural networks corresponding to non-empty voxels of the plurality of 3D grids, and wherein the at least one server is configured to select a given neural network from amongst the plurality of neural networks for rendering a given image from a perspective of a given viewpoint, based on:
- a resolution at which the given image is to be rendered, and
- a distance of a given point in the given real-world environment that is to be represented by a corresponding pixel of the given image from a 3D position of the given viewpoint.

34. The system of claim 18, wherein a given node of the at least one 3D data structure is an oriented bounding box (OBB).

35. A computer program product comprising a non-transitory machine-readable data storage medium having stored thereon program instructions that, when executed by a processor, cause the processor to execute steps of a computer-implemented method of claim 1.

* * * * *